(12) United States Patent
Gupta et al.

(10) Patent No.: US 11,263,143 B2
(45) Date of Patent: Mar. 1, 2022

(54) COHERENT ACCELERATOR FABRIC CONTROLLER

(71) Applicant: Intel Corporation, Santa Clara, CA (US)

(72) Inventors: Ritu Gupta, Sunnyvale, CA (US); Aravindh V. Anantaraman, Folsom, CA (US); Stephen R. Van Doren, Portland, OR (US); Ashok Jagannathan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 911 days.

(21) Appl. No.: 15/720,231

(22) Filed: Sep. 29, 2017

(65) Prior Publication Data

US 2019/0102311 A1    Apr. 4, 2019

(51) Int. Cl.
  *G06F 12/00* (2006.01)
  *G06F 12/0884* (2016.01)
  *G06F 13/42* (2006.01)

(52) U.S. Cl.
  CPC ...... *G06F 12/0884* (2013.01); *G06F 13/4282* (2013.01); *G06F 2212/621* (2013.01); *G06F 2213/0026* (2013.01)

(58) Field of Classification Search
  CPC ............. G06F 12/0884; G06F 13/4282; G06F 2212/621; G06F 2213/0026; G06F 12/0831; G06F 12/0897; G06F 13/124; G06F 13/1678
  USPC .......................................................... 711/138
  See application file for complete search history.

(56) References Cited

U.S. PATENT DOCUMENTS

| 2006/0179222 | A1* | 8/2006 | Chung | G06F 12/0811 711/122 |
| 2007/0094477 | A1* | 4/2007 | Espasa | G06F 9/3824 711/217 |
| 2010/0153656 | A1* | 6/2010 | Yoshikawa | G06F 12/0859 711/141 |
| 2011/0072234 | A1* | 3/2011 | Chinya | G06F 12/121 711/207 |
| 2013/0205121 | A1* | 8/2013 | Guthrie | G06F 9/30145 712/220 |
| 2013/0262776 | A1 | 10/2013 | Asaro et al. | |
| 2014/0055467 | A1 | 2/2014 | Bittner et al. | |
| 2016/0077976 | A1 | 3/2016 | Raikin et al. | |

(Continued)

OTHER PUBLICATIONS

German Patent and Trademark Office; Office Action issued in German Patent Application No. 102018006756.5, dated Jun. 18, 2019; 15 pages including English translation.

(Continued)

*Primary Examiner* — Mardochee Chery
(74) *Attorney, Agent, or Firm* — Alliance IP, LLC

(57) ABSTRACT

A fabric controller is provided for a coherent accelerator fabric. The coherent accelerator fabric includes a host interconnect, a memory interconnect, and an accelerator interconnect. The host interconnect communicatively couples to a host device. The memory interconnect communicatively couples to an accelerator memory. The accelerator interconnect communicatively couples to an accelerator having a last-level cache (LLC). An LLC controller is provided that is configured to provide a bias check for memory access operations on the fabric.

25 Claims, 17 Drawing Sheets

(56) References Cited

U.S. PATENT DOCUMENTS

2017/0270062 A1   9/2017   Sharma

OTHER PUBLICATIONS

Teich, Paul; "The Heart of AMD's Epyc Comeback is Infinity Fabric," published Jul. 12, 2017; https://web.archive.org/web/2017081708232/https://www.nextplatform.com/2017/07/12/heart-amds-epyc-comeback-Infinity-fabric/; 8 pages.

* cited by examiner

Fig. 9

IAL.mem READ OVER PCIe

| | +0 | | | | | | | | +1 | | | | | | | | +2 | | | | | | | | | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Byte 0 | 001 | | | 0000 | | | | | R | TC | | | R | Attr | | | R | Attr | | | | | TH | TD | EP | Attr | | AT | | MemOpcode | | | Meta Field | | Meta Value | | TC |
| Byte 4 | REQUESTER ID=HOST | | | | | | | | | | | | | | | | TAG | | | | | | | | | | | | | | SnpType | | | R |
| Byte 8 | ADDRESS[63:32] | | | | | | | | | | | | | | | | | | | | | | | | | | | | | | | | |
| Byte 12 | ADDRESS[31:2] | | | | | | | | | | | | | | | | | | | | | | | | | | | | | | PH | | |

900

IAL.mem WRITE OVER PCIe

| | +0 | | | | | | | | +1 | | | | | | | | +2 | | | | | | | | |
|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Byte 0 | 011 | | | 11011 | | | | | R | TC | | | R | Attr | | | R | TH | TD | EP | Attr | | AT | | |
| Byte 4 | REQUESTER ID=HOST | | | | | | | | | | | | | | | | TAG | | | | | | | | |
| | | | | | | | | | | | | | | | | | MemOpcode | | | | Meta Field | | Meta Value | | TC |
| Byte 8 | ADDRESS[63:32] | | | | | | | | | | | | | | | | | | | | | | | | |
| | | | | | | | | | | | | | | | | | SnpType | | | | | | R | | |
| Byte 12 | ADDRESS[31:2] | | | | | | | | | | | | | | | | | | | | | | | PH | |
| | DATA[511:0] | | | | | | | | | | | | | | | | | | | | | | | | |

IAL.mem COMPLETION WITH DATA OVER PCIe

1100

| | +0 | | | | | | | | +1 | | | | | | | | +2 | | | | | | | | | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Byte 0 | FMT | | | TYPE | | | | | R | | | TC | | | | R | Attr | | R | TH | TD | EP | Attr | | AT | | LENGTH | | | | | | |
| Byte 4 | COMPLETER ID | | | | | | | | | | | | | | | COMPL STATUS | | | | BCM | | | | Opcode | | | R | Meta Field | | Meta Value | | PCLS |
| Byte 8 | REQUESTER ID | | | | | | | | | | | | | | | TAG | | | | | | | | | | | R | | PRE | | | |
| | DATA [511:0] | | | | | | | | | | | | | | | | | | | | | | | | | | | | | | | |

*Fig. 11*

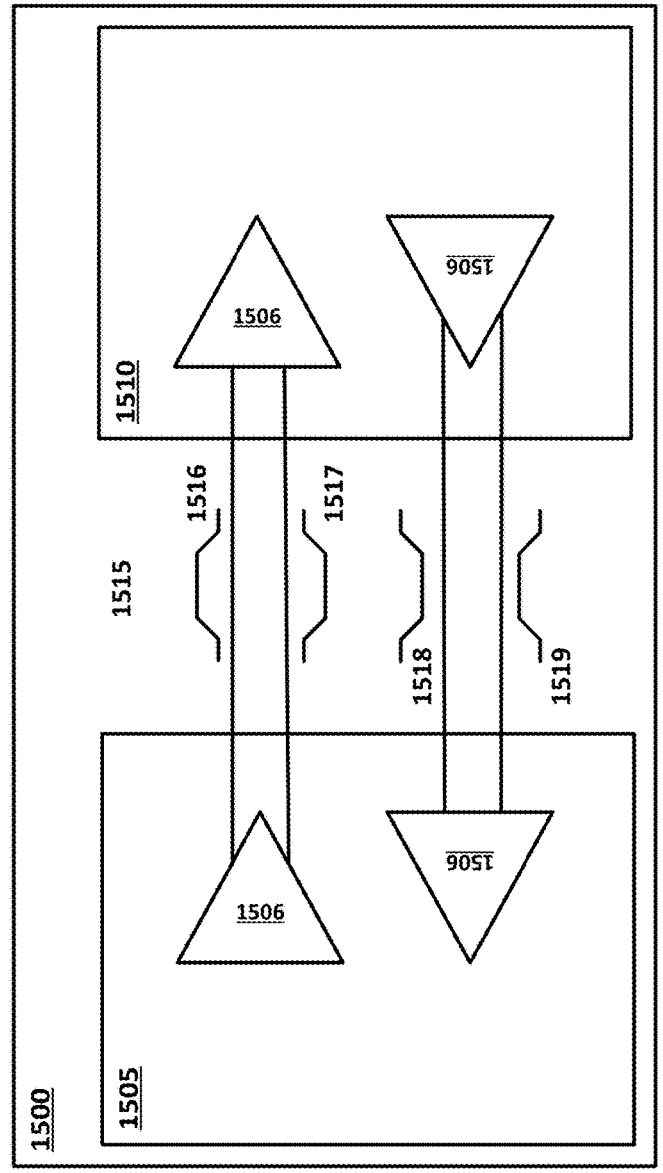

COHERENT ACCELERATOR FABRIC CONTROLLER

FIELD OF THE SPECIFICATION

This disclosure relates in general to the field of interconnect devices, and more particularly, though not exclusively, to a system and method for coherent memory devices over Peripheral Component Interconnect Express (PCIe).

BACKGROUND

Computing systems include various components to manage demands on processor resources. For example, developers may include a hardware accelerator (or "accelerator") operably coupled to a central processing unit (CPU). In general, an accelerator is an autonomous element configured to perform functions delegated to it by the CPU. An accelerator may be configured for specific functions and/or may be programmable. For instance, an accelerator may be configured to perform specific calculations, graphics functions, and/or the like. When an accelerator performs an assigned function, the CPU is free to devote resources to other demands. In conventional systems, the operating system (OS) may manage the physical memory available within the computing system (for instance, "system memory"); however, the OS does not manage or allocate memory that is local to an accelerator. As a result, memory protection mechanisms, such as cache coherency, introduce inefficiencies into accelerator-based configurations. For instance, conventional cache coherence mechanisms limit the ability of an accelerator to access its attached, local memory at very high bandwidth and/or limit deployment options for the accelerator.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 9 is a block diagram of an Intel® accelerator link memory (IAL.mem) read over PCIe operation, according to one or more examples of the present specification.

FIG. 10 is a block diagram of an IAL.mem write over PCIe operation, according to one or more examples of the present specification.

FIG. 11 is a block diagram of an IAL.mem completion with data over PCIe operation, according to one or more examples of the present specification.

FIG. 14 illustrates an embodiment of a PCIe transaction descriptor, according to one or more examples of the present specification.

FIG. 15 illustrates an embodiment of a PCIe serial point-to-point fabric, according to one or more examples of the present specification.

EMBODIMENTS OF THE DISCLOSURE

Figure 1:
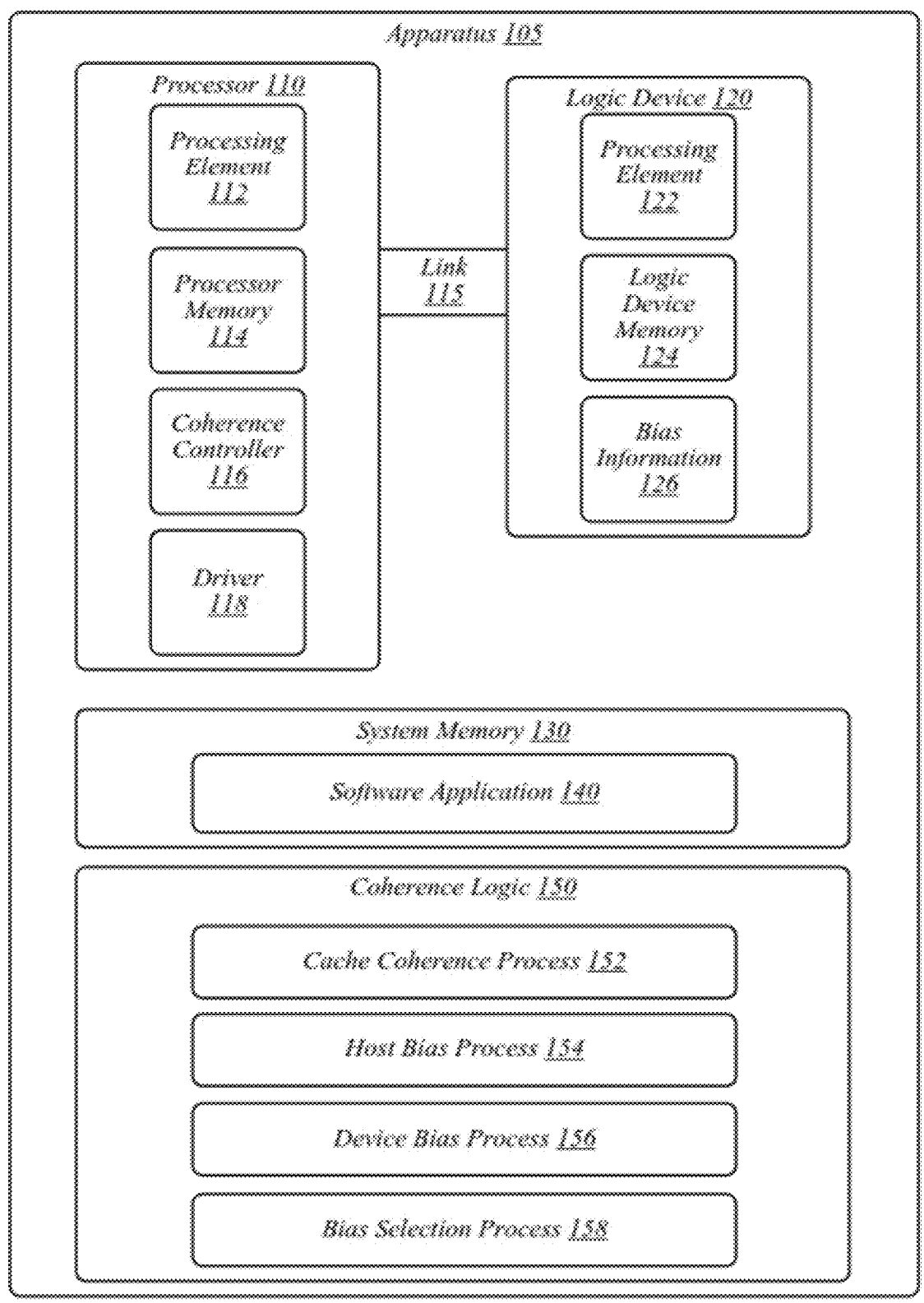
FIG. 1 illustrates an example operating environment that may be representative of various embodiments, according to one or more examples of the present specification.

The Intel® accelerator link (IAL) of the present specification is an extension to the Rosetta Link (R-Link) multichip package (MCP) interconnect link. IAL extends the R-Link protocol to allow it to support accelerators and input/output (IO) devices that may not be adequately supported by the baseline R-Link or Peripheral Component Interconnect Express (PCIe) protocols.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention.

In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™, and may be also used in other devices, such as handheld devices, tablets, other thin notebooks, systems on a chip (SOC) devices, and embedded applications.

Some examples of handheld devices include cellular phones, Internet protocol devices, digital cameras, personal digital assistants (PDAs), and handheld personal computers (PCs). Embedded applications typically include a microcontroller, a digital signal processor (DSP), a system on a chip (SoC), network personal computers (NetPCs), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Various embodiments may be generally directed to techniques for providing cache coherence between a plurality of components within a processing system. In some embodiments, the plurality of components may include a processor, such as a central processing unit (CPU), and a logic device communicatively coupled to the processor. In various embodiments, the logic device may include a local, attached memory. In some embodiments, the plurality of components may include a processor communicatively coupled to an accelerator having a local, attached memory (for instance, logic device memory).

In some embodiments, the processing system may operate a coherence bias process configured to provide a plurality of cache coherence processes. In some embodiments, the plurality of cache coherence processes may include a device bias process and a host bias process (together, "bias protocol flows"). In some embodiments, the host bias process may route requests to the local, attached memory of the logic device through a coherence component of the processor, including requests from the logic device. In some embodiments, the device bias process may route logic device requests for logic device memory directly to the logic device memory, for instance, without consulting the coherence component of the processor. In various embodiments, the cache coherence process may switch between the device bias process and the host bias processes based on a bias indicator determined using application software, hardware hints, a combination thereof, and/or the like. Embodiments are not limited in this context.

The IAL described in this specification uses an optimized accelerator protocol (OAP), which is a further extension to the R-Link MCP interconnect protocol. The IAL may be used in one example to provide an interconnect fabric to an accelerator device (the accelerator device may be, in some examples, a heavy-duty accelerator that performs, for example, graphics processing, dense computation, Smart-NIC services, or similar). The accelerator may have its own attached accelerator memory, and an interconnect fabric such as IAL or in some embodiments a PCIe-based fabric may be used to attach the processor to the accelerator. The interconnect fabric may be a coherent accelerator fabric, in which case the accelerator memory can be mapped to the memory address space of the host device. The coherent accelerator fabric may maintain coherency within the accelerator and between the accelerator and the host device. This can be used to implement state-of-the-art memory and coherency support for these types of accelerators.

Advantageously, coherent accelerator fabrics according to the present specification may provide optimizations that increase efficiency and throughput. For example, an accelerator may have some number of n memory banks, with corresponding n last level caches (LLCs) each controlled by an LLC controller. The fabric may provide different kinds of interconnects to connect the accelerator and its caches to the memory, and to connect the fabric to the host device.

By way of illustration, throughout this specification, buses or interconnects that connect devices that are of the same nature are referred to as "horizontal" interconnects, while interconnects or buses that connect different devices upstream and downstream may be referred to as "vertical" interconnect. The terms horizontal and vertical are used here solely for convenience and are not intended to imply any necessary physical arrangement of the interconnects or buses, or to require that they must be physically orthogonal to one another on a die.

For example, an accelerator may include 8 memory banks, with a corresponding 8 LLCs, which may be Level 3 (L3) cache, each controlled by an LLC controller. The coherent accelerator fabric may be divided into a number of independent "slices." Each slice services a memory bank and its corresponding LLC, and operates essentially independent of the other slices. In an example, each slice may take advantage of the biasing operations provided by IAL, and provide parallel paths to the memory bank. Memory operations that involve the host device may be routed through a fabric coherency engine (FCE), which provides the coherency with the host device. However, the LLC of any individual slice may also have a parallel bypass pathway that writes directly to the memory that connects the LLC directly to the memory bank, bypassing the FCE. This may be accomplished, for example, by providing the biasing logic (e.g., host bias or accelerator bias) in the LLC controller itself. The LLC controller may be physically separate from the FCE, and in the vertical orientation may be upstream from the FCE, thus enabling an accelerator bias memory operation to bypass the FCE and to write directly to a memory bank.

Embodiments of the present specification may also realize substantial power savings by providing a power manager that selectively turns off portions of the coherent fabric when they are not in use. For example, the accelerator may be a very large bandwidth accelerator that can perform many operations per second. While the accelerator is performing its accelerated function, it is using the fabric heavily and needs extremely high bandwidth so that computed values can be timely flushed to memory once they are computed. However, once a computation is complete, the host device may not yet be ready to consume the data. In that case, portions of the interconnect, such as vertical buses from the FCE to the LLC controller, as well as horizontal buses between the LLC controllers and the LLCs themselves may be powered down. These can remain powered down until the accelerator receives new data to operate on.

The table below illustrates several classes of accelerators. Note that the baseline R-Link may support only the first two classes of accelerator, while IAL may support all five.

| Accelerator Class | Description | Examples |
|---|---|---|
| 1. Producer-Consumer | Basic PCIe devices | Network accelerators Crypto Compression |
| 2. Producer-Consumer Plus | PCIe devices with special needs (e.g., special ordering requirements) | Storm Lake Data Center Fabric Infiniband HBA |
| 3. SW Assisted Device Memory | Accelerators with attached memory Usages where software "data placement" is practical | Discrete FPGA Graphics |
| 4. Autonomous Device Memory | Accelerators with attached memory Usages where software "data placement" is not practical | Dense computation offload GPGPU |
| 5. Giant Cache | Accelerators with attached memory Usages where data footprint is larger than attached memory | Dense computation offload GPGPU |

Note that embodiments of these accelerators may require some degree of cache coherency to support the usage models, with the exception of producer-consumer. Thus, IAL is a coherent accelerator link.

IAL uses a combination of three protocols dynamically multiplexed onto a common link to enable the accelerator models disclosed above. These protocols include:

Intel® On-chip System Fabric (IOSF)—A reformatted PCIe-based interconnect providing a non-coherent ordered semantic protocol. IOSF may include an on-chip implementation of all or part of the PCIe standard. IOSF packetizes PCIe traffic so that it can be sent to a companion die, such as in a system-on-a-chip (SoC) or multichip module (MCM). IOSF enables device discovery, device configuration, error reporting, interrupts, direct memory access (DMA)-style data transfers, and various services provided as part of the PCIe standard.

In-die interconnect (IDI)—enables a device to issue coherent read and write requests to a processor.

Scalable memory interconnect (SMI)—enables a processor to access memory attached to an accelerator.

These three protocols can be used in different combinations (e.g., IOSF alone, IOSF plus IDI, IOSF plus IDI plus SMI, IOSF plus SMI) to support various of the models described in the table above.

As a baseline, IAL provides a single link or bus definition that may cover all five accelerator models through the combination of the aforementioned protocols. Note that producer-consumer accelerators are essentially PCIe accelerators. They require only the IOSF protocol which is already a reformatted version of PCIe. IOSF supports some accelerator interfacing architecture (AiA) operations, such as support for the enqueue (ENQ) instruction, which may not be supported by industry-standard PCIe devices. IOSF therefore provides added value over PCIe for this class of accelerator. Producer-consumer plus accelerators are accelerators that may use just the IDI and IOSF layers of the IAL.

Software assisted device memory and autonomous device memory may in some embodiments require the SMI protocol on IAL, including the inclusion of special operation codes (opcodes) on SMI and special controller support for flows associated with those opcodes in the processor. These additions support the coherency bias model of IAL. The usage may employ all of IOSF, IDI, and SMI.

The giant cache usage employs IOSF, IDI, and SMI as well, but may also add new qualifiers to the IDI and SMI protocols that are designed specifically for use with giant cache accelerators (i.e., not employed in the device memory models discussed above). Giant cache may add new special controller support in the processor that is not required by any of the other usages.

IAL refers to these three protocols as IAL.IO, IAL.cache, and IAL.mem. The combination of these three protocols provides the desired performance benefits for the five accelerator models.

To achieve these benefits, IAL may use R-Link (for MCP), or Flexbus (for discrete) physical layers to allow dynamic multiplexing of the IO, cache, and mem protocols.

However, some form factors do not natively support the R-Link or Flexbus physical layers. Particularly, the class 3 and 4 device memory accelerators may not support R-Link or Flexbus. Existing examples of these may use standard PCIe, which limits the devices to a private memory model, rather than providing a coherent memory that can be mapped to the write-back memory address space of the host device. This model is limited because the memory attached to the device is thus not directly addressable by software. This can result in suboptimal data marshaling between the host and device memory across a bandwidth-limited PCIe link.

Thus, embodiments of the present specification provide coherency semantics that follow the same bias model-based definition defined by IAL, which retains the benefits of coherency without the traditional incurred overheads. All of these may be provided over an existing PCIe physical link.

Thus, some of the advantages of the IAL may be realized over a physical layer that does not provide the dynamic multiplexing between the IO, cache, and mem protocols provided by R-Link and Flexbus. Advantageously, enabling an IAL protocol over PCIe for certain classes of devices lowers the burden of entry for the ecosystem of devices that use physical PCIe links. It enables the leveraging of existing PCIe infrastructure, including the use of off-the-shelf components such as switches, root ports, and end points. This also allows for a device with attached memory to be used across platforms more easily, using the traditional private memory model or the coherent system addressable memory model as appropriate to the installation.

To support class 3 and 4 devices as described above (software-assisted memory and autonomous device memory), the components of IAL may be mapped as follows:

IOSF or IAL.io may use standard PCIe. This may be used for device discovery, enumeration, configuration, error reporting, interrupts, and DMA-style data transfers.

SMI or IAL.mem may use SMI tunneling over PCIe. Details of SMI tunneling over PCIe are described below, including with the tunneling described in FIGS. 9, 10, and 11 below.

IDI or IAL.cache is not supported in certain embodiments of this specification. IDI enables the device to issue coherent read or write requests to a host memory. Even though IAL.cache may not be supported, the methods disclosed here may be used to enable bias-based coherency for device attached memory.

To achieve this result, the accelerator device may use one of its standard PCIe memory base address register (BAR) regions to the size of its attached memory. To do so, the device may implement a designated vendor-specific extended capability (DVSEC), similar to standard IAL, to point the BAR region which should be mapped to the coherent address space. Furthermore, the DVSEC may declare additional information such as memory type, latency, and other attributes that help the basic input/output system (BIOS) map this memory to system address decoders in the coherent region. The BIOS may then program the memory base and limit host physical address in the device.

This allows the host to read device attached memory using standard PCIe memory read (MRd) opcode.

For writes, however, non-posted semantics may be needed because access to metadata may be needed on the completion. To get the NP MWr on PCIe, the following reserved encodings may be used:

Fmt[2:0]—011b
Type[4:0]—11011b

The use of a novel non-posted memory write (NP MWr) on PCIe has the additional benefit of enabling AiA ENQ instructions for efficient work submissions to the device.

To achieve the best quality of service, embodiments of the present specification may implement three different virtual channels (VC0, VC1, and VC2) to separate different traffic types as follows:

VC0→all memory-mapped input/output (MMIO) & configuration (CFG) traffic, both upstream and downstream
VC1→IAL.mem writes (from host to device)
VC2→IAL.mem reads (from host to device)

Note that because IAL.cache or IDI is not supported, embodiments of this specification may not permit the accelerator device to issue coherent reads or writes to the host memory.

Embodiments of this specification may also have the ability to flush cache lines from the host (required for host to device bias flip). This may be done using a non-allocating zero length write from the device on the PCIe on a cache line granularity. Non-allocating semantics are described using transaction and processing hints on the transaction layer packets (TLPs).

TH=1, PH=01

This allows the host to invalidate a given line. The device may issue a read following a page bias flip to ensure all lines are flushed. The device may also implement a content-addressed memory (CAM) to ensure that while a flip is in progress, no new requests to the line are received from the host.

A system and method for coherent memory devices over PCIe will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 illustrates an example operating environment 100 that may be representative of various embodiments, according to one or more examples of the present specification. The operating environment 100 depicted in FIG. 1 may include an apparatus 105 having a processor 110, such as a central processing unit (CPU). Processor 110 may include any type of computational element, such as but not limited to, a microprocessor, a microcontroller, a complex instruction set computing (CISC) microprocessor, a reduced instruction set (RISC) microprocessor, a very long instruction word (VLIW) microprocessor, a virtual processor such as a virtual central processing unit (VCPU), or any other type of processor or processing circuit. In some embodiments, processor 110 may be one or more processors in the family of Intel® processors available from Intel® Corporation of Santa Clara, Calif. Although only one processor 110 is depicted in FIG. 1, an apparatus may include a plurality of processors 110. Processor 110 may include a processing element 112, for instance, a processing core. In some embodiments, processor 110 may include a multi-core processor having a plurality of processing cores. In various embodiments, processor 110 may include processor memory 114, which may include, for instance, a processor cache or local cache memory to facilitate efficient access to data being processed by processor 110. In some embodiments, processor memory 114 may include random access memory (RAM); however, processor memory 114 may be implemented using other memory types such as dynamic RAM (DRAM), synchronous DRAM (SDRAM), combinations thereof, and/or the like.

As shown in FIG. 1, processor 110 may be communicatively coupled to a logic device 120 via a link 115. In various embodiments, logic device 120 may include a hardware device. In various embodiments, logic device 120 may include an accelerator. In some embodiments, logic device 120 may include a hardware accelerator. In various embodiments, logic device 120 may include an accelerator implemented in hardware, software, or any combination thereof.

Although an accelerator may be used as an example logic device 120 in this Detailed Description, embodiments are not so limited as logic device 120 may include any type of device, processor (for instance, a graphics processing unit (GPU)), logic unit, circuitry, integrated circuit, application-specific integrated circuit (ASIC), field-programmable gate array (FPGA), memory unit, computational unit, and/or the like capable of operating according to some embodiments. In an embodiment in which logic device 120 includes an accelerator, logic device 120 may be configured to perform one or more functions for processor 110. For example, logic device 120 may include an accelerator operative to perform graphics functions (for instance, a GPU or graphics accelerator), floating point operations, fast Fourier transform (FFT) operations, and/or the like. In some embodiments, logic device 120 may include an accelerator configured to operate using various hardware components, standards, protocols, and/or the like. Non-limiting examples of types of accelerators and/or accelerator technology capable of being used by logic device may include OpenCAPI™, CCIX, GenZ, NVIDIA® NVLink™, accelerator interfacing architecture (AiA), cache coherent agent (CCA), globally mapped and coherent device memory (GCM), Intel® graphics media accelerator (GMA), Intel® virtualization technology for directed input/output (IO) (for instance, VT-d, VT-x, and/or the like), shared virtual memory (SVM), and/or the like. Embodiments are not limited in this context.

Logic device 120 may include a processing element 122, such as a processing core. In some embodiments, logic device 120 may include a plurality of processing elements 122. Logic device 120 may include logic device memory 124, for example, configured as a local, attached memory for logic device 120. In some embodiments, logic device memory 124 may include local memory, cache memory, and/or the like. In various embodiments, logic device memory 124 may include random access memory (RAM); however, logic device memory 124 may be implemented using other memory types such as dynamic RAM (DRAM), synchronous DRAM (SDRAM), combinations thereof, and/or the like. In some embodiments, at least a portion of logic device memory 124 may be visible or accessible by processor 110. In some embodiments, at least a portion of logic device memory 124 may be visible or accessible by processor 110 as system memory (for example, as an accessible portion of system memory 130).

In various embodiments, processor 110 may execute a driver 118. In some embodiments, driver 118 may be operative to control various functional aspects of logic device 120 and/or to manage communication with one or more applications that use logic device 120 and/or computational results generated by logic device 120. In various embodiments, logic device 120 may include and/or may access bias information 126. In some embodiments, bias information 126 may include information associated with a coherence bias process. For example, bias information 126 may include information indicating which cache coherence process may be active for logic device 120 and/or a particular process, application, thread, memory operation, and/or the like. In some embodiments, bias information 126 may be read, written, or otherwise managed by driver 118.

In some embodiments, link 115 may include a bus component, such as a system bus. In various embodiments, link 115 may include a communications link operative to support multiple communication protocols (for instance, a multi-protocol link). Supported communication protocols may include standard load/store IO protocols for component communication, including serial link protocols, device caching protocols, memory protocols, memory semantic protocols, directory bit support protocols, networking protocols, coherency protocols, accelerator protocols, data storage protocols, point-to-point protocols, fabric-based protocols, on-package (or on-chip) protocols, fabric-based on-package protocols, and/or the like. Non-limiting examples of supported communication protocols may include peripheral component interconnect (PCI) protocol, peripheral component interconnect express (PCIe or PCI-E) protocol, universal serial bus (USB) protocol, serial peripheral interface (SPI) protocol, serial AT attachment (SATA) protocol, Intel® QuickPath Interconnect (QPI) protocol, Intel® Ultra-Path Interconnect (UPI) protocol, Intel's® Optimized Accelerator Protocol (OAP), Intel® Accelerator Link (IAL), intra-device interconnect (IDI) protocol (or IAL.cache), Intel® On-Chip Scalable Fabric (IOSF) protocol (or IAL.io), scalable memory interconnect (SMI) protocol (or IAL.mem), SMI 3rd generation (SMI3), and/or the like. In some embodiments, link 115 may support an intra-device protocol (for instance, IDI) and a memory interconnect protocol (for instance, SMI3). In various embodiments, link 115 may support an intra-device protocol (for instance, IDI), a memory interconnect protocol (for instance, SMI3), and a fabric-based protocol (for instance, IOSF).

In some embodiments, apparatus 105 may include system memory 130. In various embodiments, system memory 130 may include main system memory for apparatus 105. System memory 130 may store data and sequences of instructions that are executed by processor 110, or any other device or component of apparatus 105. In some embodiments, system memory 130 may RAM; however, system memory 130 may be implemented using other memory types such as dynamic DRAM, SDRAM, combinations thereof, and/or the like. In various embodiments, system memory 130 may store a software application 140 (for example, "host software") executable by processor 110. In some embodiments, software application 140 may use or otherwise be associated with logic device 120. For instance, software application 140 may be configured to use computations results generated by logic device 120.

Apparatus may include coherence logic 150 to provide cache coherence processes. In various embodiments, coherence logic 150 may be implemented in hardware, software, or a combination thereof. In some embodiments, at least a portion of coherence logic 150 may be arranged in, partially arranged in, or otherwise associated with processor 110. For example, in some embodiments, coherence logic 150 for a cache coherence element or process 152 may be arranged within processor 110. In some embodiments, processor 110 may include a coherence controller 116 to perform various cache coherence processes, such as cache coherence process 152. In some embodiments, cache coherence process 152 may include one or more standard cache coherence techniques, functions, methods, processes, elements (including hardware or software elements), protocols, and/or the like performed by processor 110. In general, cache coherence process 152 may include a standard protocol for managing the caches of a system so that no data is lost or overwritten before the data is transferred from a cache to a target memory. Non-limiting examples of standard protocols performed or supported by cache coherence process 152 may include snoop-based (or snoopy) protocols, write invalidate protocols, write update protocols, directory-based protocols, hardware-based protocols (for instance, a modified exclusive shared invalid (MESI) protocol), private memory-based protocols, and/or the like. In some embodiments, cache coherence process 152 may include one or more standard cache coherence protocols to maintain cache coherence for a logic device 120 having an attached logic device memory 124. In some embodiments, cache coherence process 150 may be implemented in hardware, software, or a combination thereof.

In some embodiments, coherence logic 150 may include coherence bias processes such as a host bias process or element 154 and a device bias process or element 156. In general, coherence bias processes may operate to maintain cache coherence relating to requests, data flows, and/or other memory operations relating to logic device memory 122. In some embodiments, at least a portion of coherence logic, such host bias process 154, device bias process 156, and/or a bias selection component 158 may be arranged outside of processor 110, for example, in one or more individual coherence logic 150 units. In some embodiments, host bias process 154, device bias process 156, and/or bias selection component 158 may be implemented in hardware, software, or a combination thereof.

In some embodiments, host bias process 154 may include techniques, processes, data flows, data, algorithms, and/or the like that process requests for logic device memory 124 through cache coherence process 152 of processor 110, including requests from logic device 120. In various embodiments, device bias process 156 may include techniques, processes, data flows, data, algorithms, and/or the like that allow logic device 120 to directly access logic device memory 124, for example, without using cache coherence process 152. In some embodiments, bias selection process 158 may include techniques, processes, data flows, data, algorithms, and/or the like for activating host bias process 154 or device bias process 156 as an active bias process for requests associated with logic device memory. In various embodiments, the active bias process may be based on bias information 126, which may include data, data structures, and/or processes used by bias selection process to determine the active bias process and/or to set the active bias process.

Figure 2A:
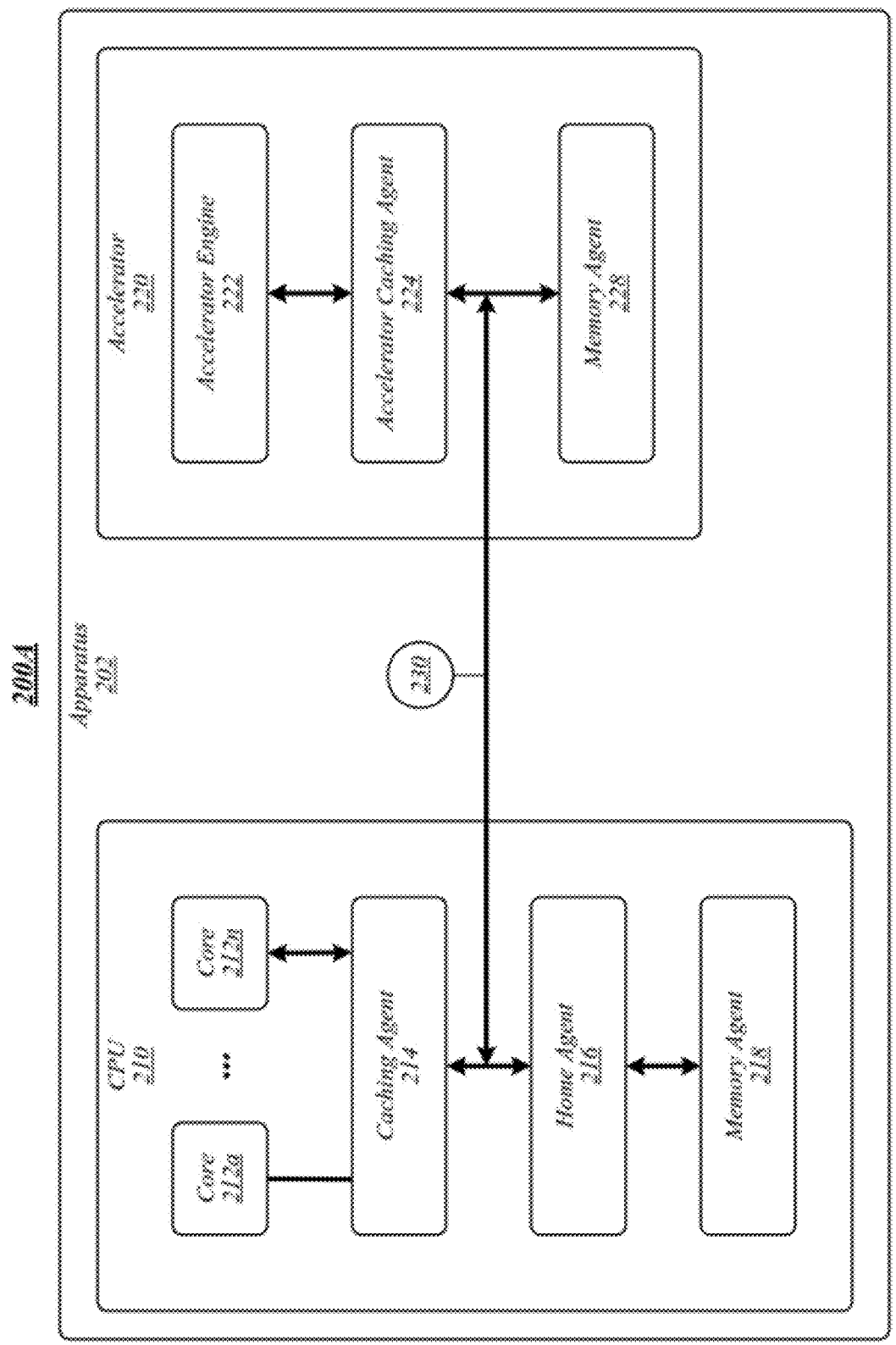
FIG. 2a illustrates an example of a full-coherence operating environment, according to one or more examples of the present specification.

FIG. 2a illustrates an example of a full-coherence operating environment 200A. The operating environment 200A depicted in FIG. 2a may include an apparatus 202 having a CPU 210 that includes a plurality of processing cores 212a-n. As shown in FIG. 2a, CPU may include various protocol agents, such as a caching agent 214, home agent 216, memory agent 218, and/or the like. In general, caching agent 214 may operate to initiate transactions into coherent memory and to retain copies in its own cache structure. Caching agent 214 may be defined by the messages it may sink and source according to behaviors defined in a cache coherence protocol associated with CPU. Caching agent 214 may also provide copies of the coherent memory contents to other caching agents (for instance, accelerator caching agent 224). Home agent 216 may be responsible for the protocol side of memory interactions for CPU 210, including coherent and non-coherent home agent protocols. For example, home agent 216 may order memory reads/writes. Home agent 216 may be configured to service coherent transactions, including handshaking as necessary with caching agents. Home agent 216 may operate to supervise a portion of the coherent memory of CPU 210, for example, maintaining the coherency for a given address space. Home agent 216 may be responsible for managing conflicts that may arise among the different caching agents. For instance, home agent 216 may provide the appropriate data and ownership responses as required by a given transaction's flow. Memory agent 218 may operate to manage access to memory. For example, memory agent 218 may facilitate memory operations (for instance, load/store operations) and functions (for instance, swaps, and/or the like) for CPU 210.

As shown in FIG. 2a, apparatus 202 may include an accelerator 220 operatively coupled to CPU 210. Accelerator 220 may include an accelerator engine 222 operative to perform functions (for instance, calculations, and/or the like) offloaded by CPU 210. Accelerator 220 may include an accelerator caching agent 224 and a memory agent 228.

Accelerator 220 and CPU 210 may be configured according to and/or to include various conventional hardware and/or memory access techniques. For instance, as shown in FIG. 2a, all memory accesses, including those initiated by accelerator 220, must go through pathway 230. Pathway 230 may include a non-coherent link, such as a PCIe link. In the configuration of apparatus 202, accelerator engine 222 may be able to directly access accelerator caching agent 224 and memory agent 228, but not caching agent 214, home agent 216, or memory agent 218. Similarly, cores 212a-n would not be able to directly access memory agent 228. Accordingly, the memory behind memory agent 228 would not be part of the system address map seen by cores 212a-n. Because cores 212a-n can't access a common memory agent, data can only be exchanged via copies. In certain implementations, a driver may be used to facilitate the copying of data back and forth between memory agents 218 and 228. For example, drivers can include a run-time element that creates a shared memory abstraction that hides all of the copies from the programmer. In contrast, and described in detail below, some embodiments may provide for configurations in which requests from an accelerator engine may be forced to cross a link between the accelerator and the CPU when the accelerator engine wants to access an accelerator memory, such as via an accelerator agent 228.

Figure 2B:
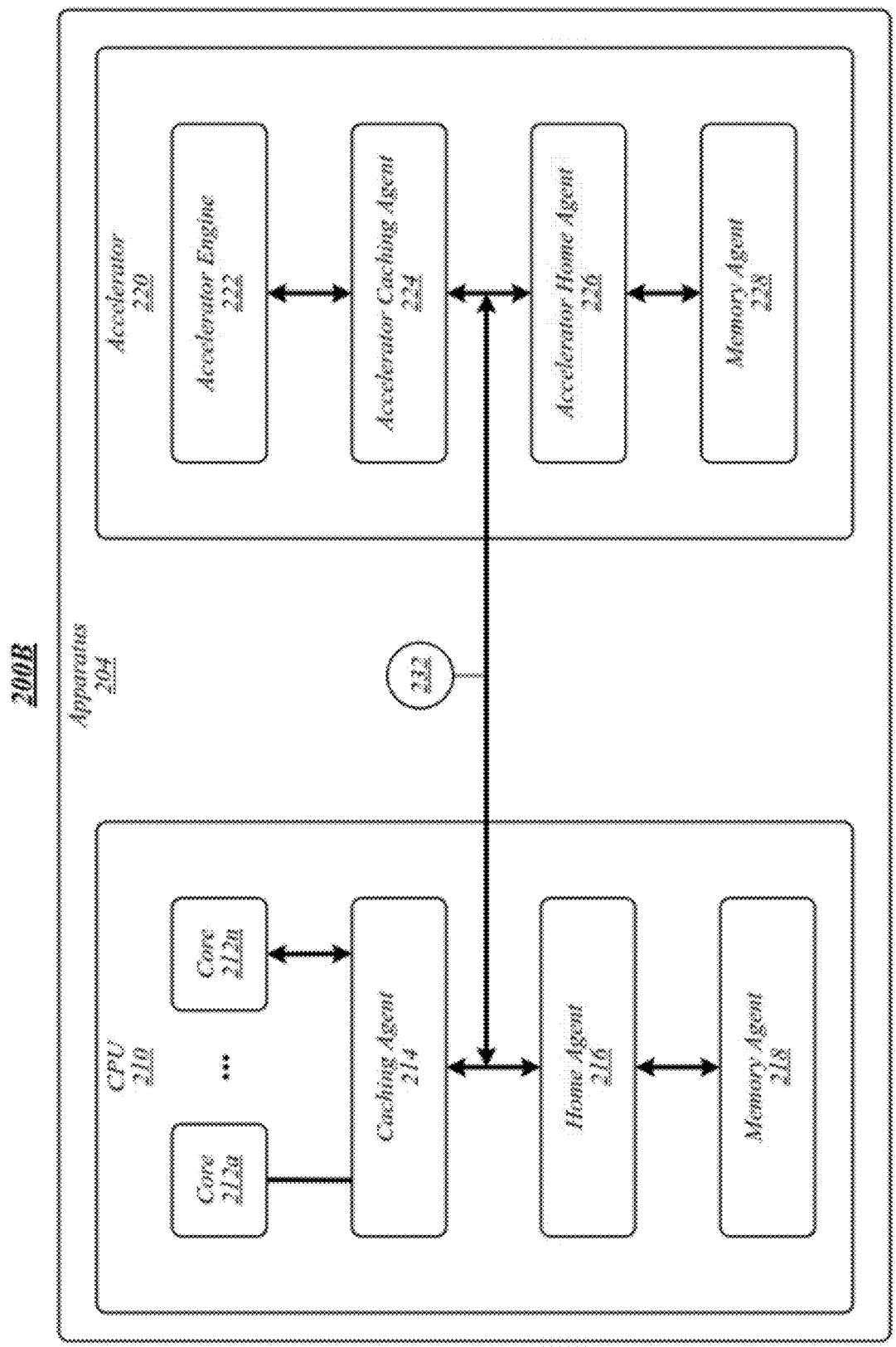
FIG. 2b illustrates an example of a non-coherent operating environment, according to one or more examples of the present specification.

FIG. 2b illustrates an example of a non-coherent operating environment 200B. The operating environment 200B depicted in FIG. 2b may include an accelerator 220 having an accelerator home agent 226. CPU 210 and accelerator 220 may be operably coupled via a non-coherent pathway 232, such as a UPI pathway or a CCIX pathway.

For the operation of apparatus 204, accelerator engine 222 and cores 212a-n can access both memory agents 228 and 218. Cores 212a-n can access memory 218 without crossing link 232, and accelerator agent 222 can access memory 228 without crossing link 232. The cost of those local accesses from 222 to 228 is that home agent 226 needs to be built such that it can track coherency for all accesses from cores 212a-n to memory 228. This requirement leads to complexity and high resource usage when apparatus 204 includes multiple CPU 210 devices all connected via other instances of link 232. Home agent 226 needs to be able to track coherency for all cores 212a-n on all instances of CPU 210. This can become quite expensive in terms of performance, area, and power, particularly for large configurations. Specifically, it negatively impacts the performance efficiency of accesses between accelerator 222 and memory 228 for the benefit of accesses from the CPUs 210, even though the accesses from the CPUs 210 are expected to be relatively rare.

Figure 2C:
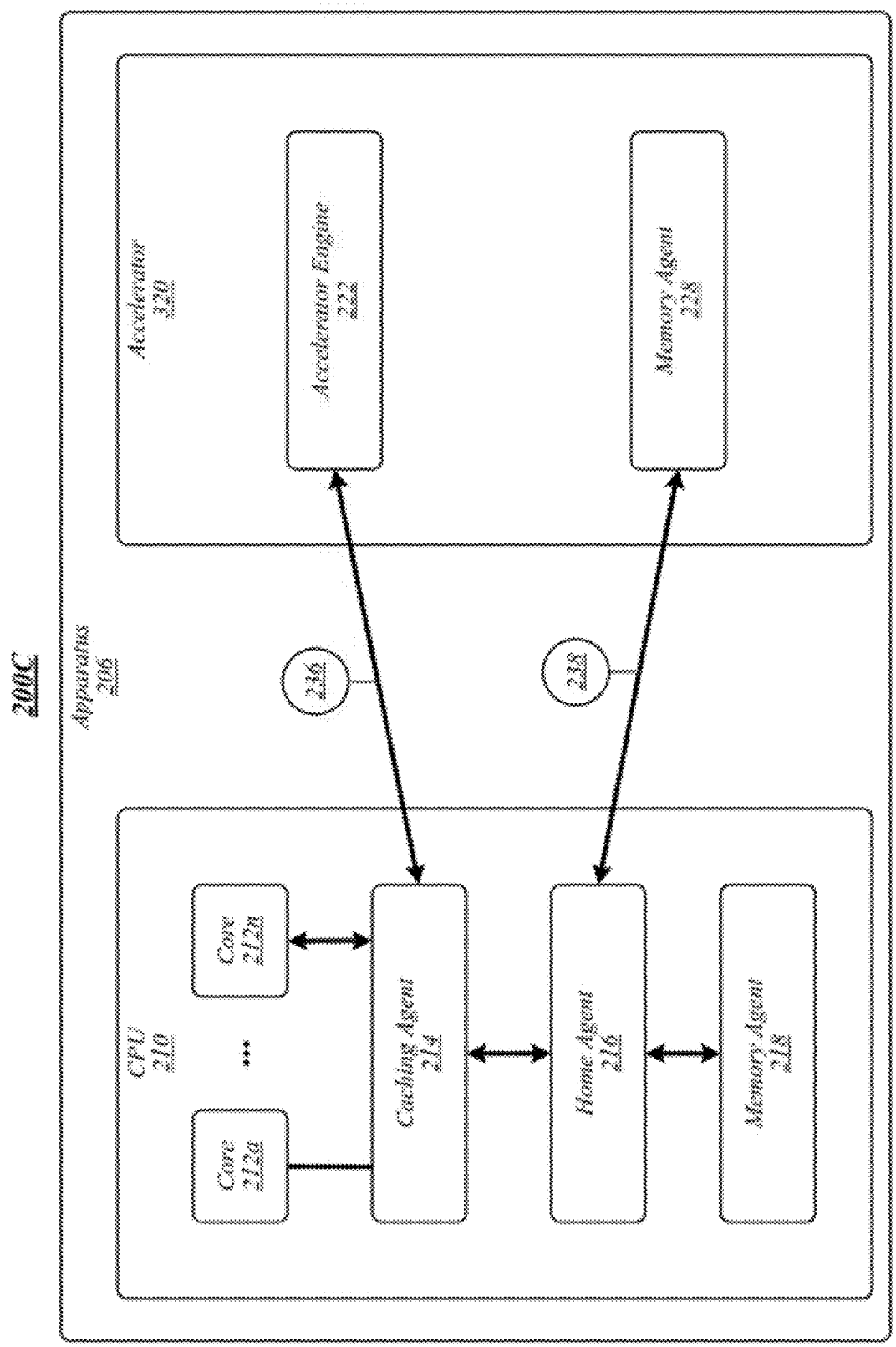
FIG. 2c illustrates an example of a coherence engine without bias operating environment, according to one or more examples of the present specification.

FIG. 2c illustrates an example of a coherence engine without bias operating environment 200C. As shown in FIG. 2, apparatus 206 may include an accelerator 220 operatively coupled to CPU 210 via coherent links 236 and 238. Accelerator 220 may include an accelerator engine 222 operative to perform functions (for instance, calculations, and/or the like) offloaded by CPU 210. Accelerator 220 may include an accelerator caching agent 224, an accelerator home agent 226, and a memory agent 228.

In the configuration of apparatus 206, accelerator 220 and CPU 210 may be configured according to and/or to include various conventional hardware and/or memory access techniques, such as CCIX, GCM, standard coherency protocols (for instance, symmetric coherency protocols), and/or the like. For instance, as shown in FIG. 2, all memory accesses, including those initiated by accelerator 220, must go through pathway 230. In this manner, accelerator 220 must go through CPU 220 (and, therefore, coherency protocols associated with CPU) in order to access accelerator memory (for instance, through memory agent 228). Accordingly, apparatus may not provide the ability to access certain memory, such as accelerator-attached memory associated with accelerator 220, as part of system memory (for instance, as part of a system address map), which may allow host software to setup operands and access computational results of accelerator 220 without the overhead of, for example, IO direct memory access (DMA) data copies. Such data copies may require driver calls, interrupts, and MMIO access that are all inefficient and complex as compared to memory accesses. The inability to access accelerator-attached memory without cache coherence overheads, as depicted in FIG. 2c, may be detrimental to the execution time of a computation offloaded to accelerator 220. For instance, in a process involving substantial streaming write memory traffic, cache coherence overhead may cut the effective write bandwidth seen by accelerator 220 in half.

The efficiency of operand setup, results access, and accelerator computation play a role in determining the effectiveness and benefits of offloading CPU 210 work to accelerator 220. If the cost of offloading work is too high, offloading may not be beneficial or may be limited to only very large jobs. Accordingly, various developers have created accelerators which attempt to increase the efficiency of using an accelerator, such as accelerator 220, with limited effectiveness compared with technology configured according to some embodiments. For instance, certain conventional GPUs may operate without mapping the accelerator-attached memory as part of the system address may or without using certain virtual memory configurations (for example, SVM) to access the accelerator-attached memory. Accordingly, in such systems, accelerator-attached memory is not visible to host system software. Rather, accelerator-attached memory is accessed only via a run-time layer of software provided by the GPUs device driver. A system of data copies and page table manipulations is used to create the appearance of a virtual memory (for example, SVM) enabled system. Such a system is inefficient, particularly compared to some embodiments, because, among other things, the system requires memory replication, memory pinning, memory copies, and complex software. Such requirements lead to substantial overhead at memory page transition points that are not required in systems configured according to some embodiments. In certain other systems, conventional hardware coherence mechanism are employed for memory operations associated with accelerator-attached memory, which limits the ability of an accelerator to access the accelerator-attached memory at a high bandwidth and/or limits the deployment options for a given accelerator (for instance, accelerators attached via an on-package or off-package link cannot be supported without substantial bandwidth loss).

In general, conventional systems may use one of two methods for accessing accelerator-attached memory: a full coherence (or full hardware coherence) method or a private memory model or method. The full coherence method requires that all memory accesses, including accesses requested by an accelerator for accelerator-attached memory, must go through the coherence protocol of the corresponding CPU. In this manner, the accelerator must take a circuitous route to access accelerator-attached memory as the request must be transmitted at least to the corresponding CPU, through the CPU coherence protocol, and then to the accelerator-attached memory. Accordingly, the full coherence method carries coherence overhead when an accelerator accesses its own memory that can substantially impair the date bandwidth that an accelerator may extract from its own attached memory. The private memory model requires significant resource and time costs, such as memory replication, page pinning requirements, page copy data bandwidth costs, and/or page transition costs (for instance, translation lookaside buffer (TLB) shoot-downs, page table manipulation, and/or the like). Accordingly, some embodiments may provide a coherence bias process configured to provide a plurality of cache coherence processes that provide, among other things, better memory utilization and improved performance for systems that include accelerator-attached memory compared with conventional systems.

Figure 3:
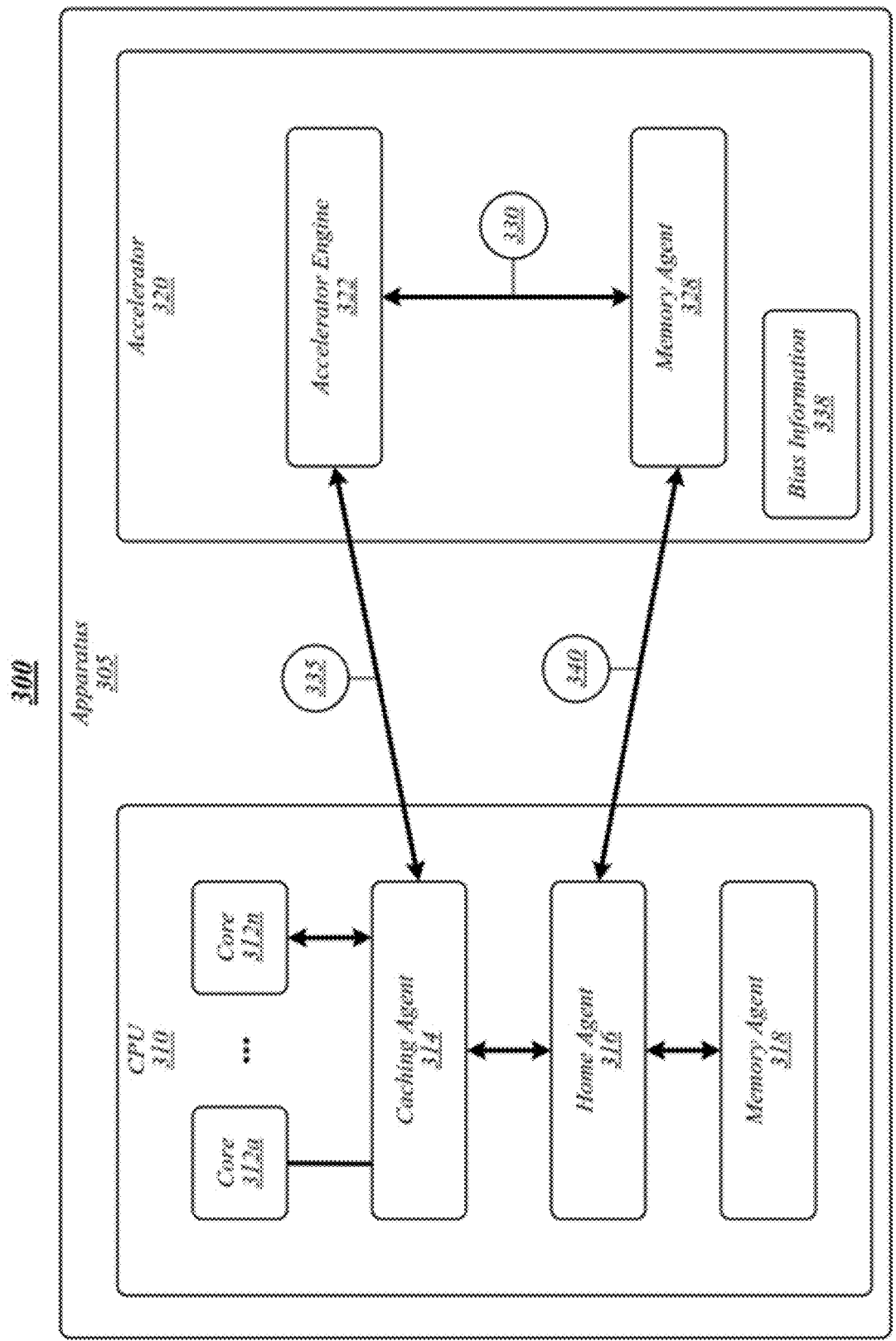
FIG. 3 illustrates an example of an operating environment that may be representative of various embodiments, according to one or more examples of the present specification.

FIG. 3 illustrates an example of an operating environment 300 that may be representative of various embodiments. The operating environment 300 depicted in FIG. 3 may include an apparatus 305 operative to provide a coherence bias process according to some embodiments. In some embodiments, apparatus 305 may include a CPU 310 having a plurality of processing cores 312a-n and various protocol agents, such as a caching agent 314, home agent 316, memory agent 318, and/or the like. CPU 310 may be communicatively coupled to accelerator 320 using various links 335, 340. Accelerator 320 may include an accelerator engine 312 and a memory agent 318, and may include or access bias information 338.

As shown in FIG. 3, accelerator engine 322 may be communicatively coupled directly to memory agent 328 via a biased coherence bypass 330. In various embodiments, accelerator 320 may be configured to operate in a device bias process in which biased coherence bypass 330 may allow memory requests of accelerator engine 322 to directly access accelerator-attached memory (not shown) of accelerator facilitated via memory agent 328. In various embodiments, accelerator 320 may be configured to operate in a host bias process in which memory operations associated with accelerator-attached memory may be processed via links 335, 340 using cache coherency protocols of CPU, for instance, via caching agent 314 and home agent 316. Accordingly, accelerator 320 of apparatus 305 may leverage the coherency protocols of CPU 310 when appropriate (for instance, when a non-accelerator entity requests accelerator-attached memory) while allowing accelerator 320 direct access to accelerator-attached memory via biased coherence bypass 330.

In some embodiments, coherence bias (for instance, whether device bias or host bias is active) may be stored in bias information 338. In various embodiments, bias information 338 may include and/or may be stored in various data structures, such as a data table (for instance, a "bias table"). In some embodiments, the bias information 338 may include a bias indicator with a value indicating the active bias (for instance, 0=host bias, 1=device bias). In some embodiments, the bias information 338 and/or bias indicator may be at various levels of granularity, such as memory regions, page tables, address ranges, and/or the like. For instance, bias information 338 may specify that certain memory pages are set for device bias, while other memory pages are set for host bias. In some embodiments, bias information 338 may include a bias table configured to operate as a low cost, scalable snoop filter.

Figure 4:
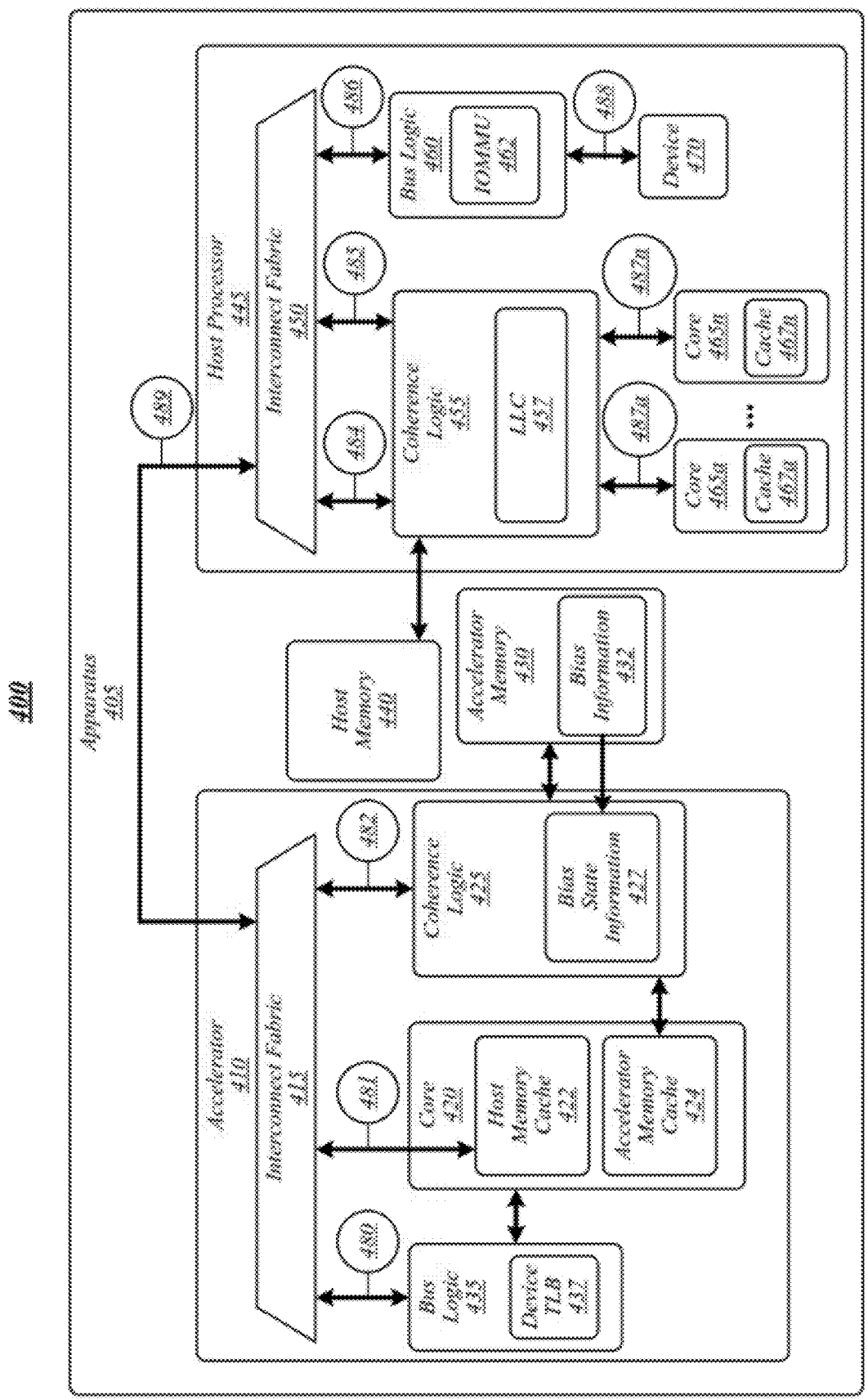
FIG. 4 illustrates a further example operating environment that may be representative of various embodiments, according to one or more examples of the present specification.

FIG. 4 illustrates an example operating environment 400 that may be representative of various embodiments. The operating environment 400 depicted in FIG. 4 may include an apparatus 405 operative to provide a coherence bias process according to some embodiments. Apparatus 405 may include an accelerator 410 communicatively coupled to a host processor 445 via a link (or multi-protocol link) 489. Accelerator 410 and host processor 445 may communicate over link using interconnect fabrics 415 and 450, respectively, that allow data and message to pass therebetween. In some embodiments, link 489 may include a multi-protocol link operable to support multiple protocols. For example, link 489 and interconnect fabrics 415 and 450 may support various communication protocols, including, without limitation, serial link protocols, device caching protocols, memory protocols, memory semantic protocols, directory bit support protocols, networking protocols, coherency protocols, accelerator protocols, data storage protocols, point-to-point protocols, fabric-based protocols, on-package (or on-chip) protocols, fabric-based on-package protocols, and/or the like. Non-limiting examples of supported communication protocols may include PCI, PCIe, USB, SPI, SATA, QPI, UPI, OAP, IAL, IDI, IOSF, SMI, SMI3, and/or the like. In some embodiments, link 489 and interconnect fabrics 415 and 450 may support an intra-device protocol (for instance, IDI) and a memory interconnect protocol (for instance, SMI3). In various embodiments, link 489 and interconnect fabrics 415 and 450 may support an intra-device protocol (for instance, IDI) a memory interconnect protocol (for instance, SMI3), and a fabric-based protocol (for instance, IOSF).

In some embodiments, accelerator 410 may include bus logic 435 having a device TLB 437. In some embodiments, bus logic 435 may be or may include PCIe logic. In various embodiments, bus logic 435 may communicate over interconnect 480 using a fabric-based protocol (for instance, IOSF) and/or a peripheral component interconnect express (PCIe or PCI-E) protocol. In various embodiments, communication over interconnect 480 may be used for various functions, including, without limitation, discovery, register access (for instance, registers of accelerator 410 (not shown)), configuration, initialization, interrupts, direct memory access, and/or address translation services (ATS).

Accelerator 410 may include a core 420 having a host memory cache 422 and an accelerator memory cache 424. Core 420 may communicate using interconnect 481 using, for example, an intra-device protocol (for instance, IDI) for various functions, such as coherent requests and memory flows. In various embodiments, accelerator 410 may include coherence logic 425 that includes or accesses bias mode information 427. Coherence logic 425 may communicate using interconnect 482 using, for example, a memory interconnect protocol (for instance, SMI3). In some embodiments, communication over interconnect 482 may be used for memory flows. Accelerator 410 may be operably coupled to accelerator memory 430 (for instance, as accelerator-attached memory) that may store bias information 432.

In various embodiments, host processor 445 may be operably coupled to host memory 440 and may include coherence logic (or coherence and cache logic) 455 having a last level cache (LLC) 457. Coherence logic 455 may communicate using various interconnects, such as interconnects 484 and 485. In some embodiments, interconnects 484 and 485 may include a memory interconnect protocol (for instance, SMI3) and/or an intra-device protocol (for instance, IDI). In some embodiments, LLC 457 may include a combination of at least a portion of host memory 440 and accelerator memory 430.

Host processor 445 may include bus logic 460 having an input-output memory management unit (IOMMU) 462. In some embodiments, bus logic 460 may be or may include PCIe logic. In various embodiments, bus logic 460 may communicate over interconnects 486 and 488 using a fabric-based protocol (for instance, IOSF) and/or a peripheral component interconnect express (PCIe or PCI-E) protocol. In various embodiments, host processor 445 may include a plurality of cores 465*a-n*, each having a cache 467*a-n*. In some embodiments, cores 465*a-n* may include Intel® Architecture (IA) cores. Each of cores 465*a-n* may communicate with coherence logic 455 via interconnects 487*a-n*. In some embodiments, interconnects 487*a-n* may support an intra-device protocol (for instance, IDI). In various embodiments, host processor may include a device 470 operable to communicate with bus logic 460 over interconnect 488. In some embodiments, device 470 may include an IO device, such as a PCIe IO device.

In some embodiments, apparatus 405 is operative to perform a coherence bias process applicable to various configurations, such as a system having an accelerator 410 and a host processor 445 (for instance, a computer processing complex that includes one or more computer processor chips), in which accelerator 410 is communicatively coupled to host processor 445 via a multi-protocol link 489 and where memory is attached directly to accelerator 410 and host processor 445 (for instance, accelerator memory 430 and host memory 440, respectively). The coherence bias process provided by apparatus 405 may provide multiple technological advantages over conventional systems, such as providing for both accelerator 410 and "host" software running on processing cores 465*a-n* to access accelerator memory 430. The coherence bias process provided by apparatus may include a host bias process and a device bias process (together, bias protocol flows) and a plurality of options for modulating and/or selecting bias protocol flows for specific memory accesses.

In some embodiments, the bias protocol flows may be implemented, at least in part, using protocol layers (for example, "bias protocol layers") on multi-protocol link 489. In some embodiments, bias protocol layers may include an intra-device protocol (for instance, IDI) and/or a memory interconnect protocol (for instance, SMI3). In some embodiments, the bias protocol flows may be enabled by using various information of the bias protocol layers, the addition of new information into the bias protocol layers, and/or the addition of support for protocols. For instance, the bias protocol flows may be implemented using existing opcodes for an intra-device protocol (for instance, IDI), the addition of opcodes to a memory interconnect protocol (for instance, SMI3) standard, and/or the addition of support for a memory interconnect protocol (for instance, SMI3) on the multi-protocol link 489 (for instance, conventional multi-protocol links may have included only an intra-device protocol (for instance, IDI) and a fabric-based protocol (for instance, IOSF)).

In some embodiments, apparatus 405 may be associated with at least one operating system (OS). The OS may be configured to not use or to not use certain portions of accelerator memory 430. Such an OS may include support for "memory only NUMA modules" (for instance, no CPU). Apparatus 405 may execute a driver (for instance, including driver 118) to perform various accelerator memory services. Illustrative and non-restrictive accelerator memory services implemented in the driver may include driver discovering and/or grabbing/allocating accelerator memory 430, providing allocation APIs and mapping pages via OS page mapping service, providing processes to manage multi-process memory oversubscription and work scheduling, providing APIs to allow software applications to set and change bias mode of memory regions of accelerator memory 430, and/or deallocation APIs that return pages to the driver's free page list and/or return pages to a default bias mode.

Figure 5A:
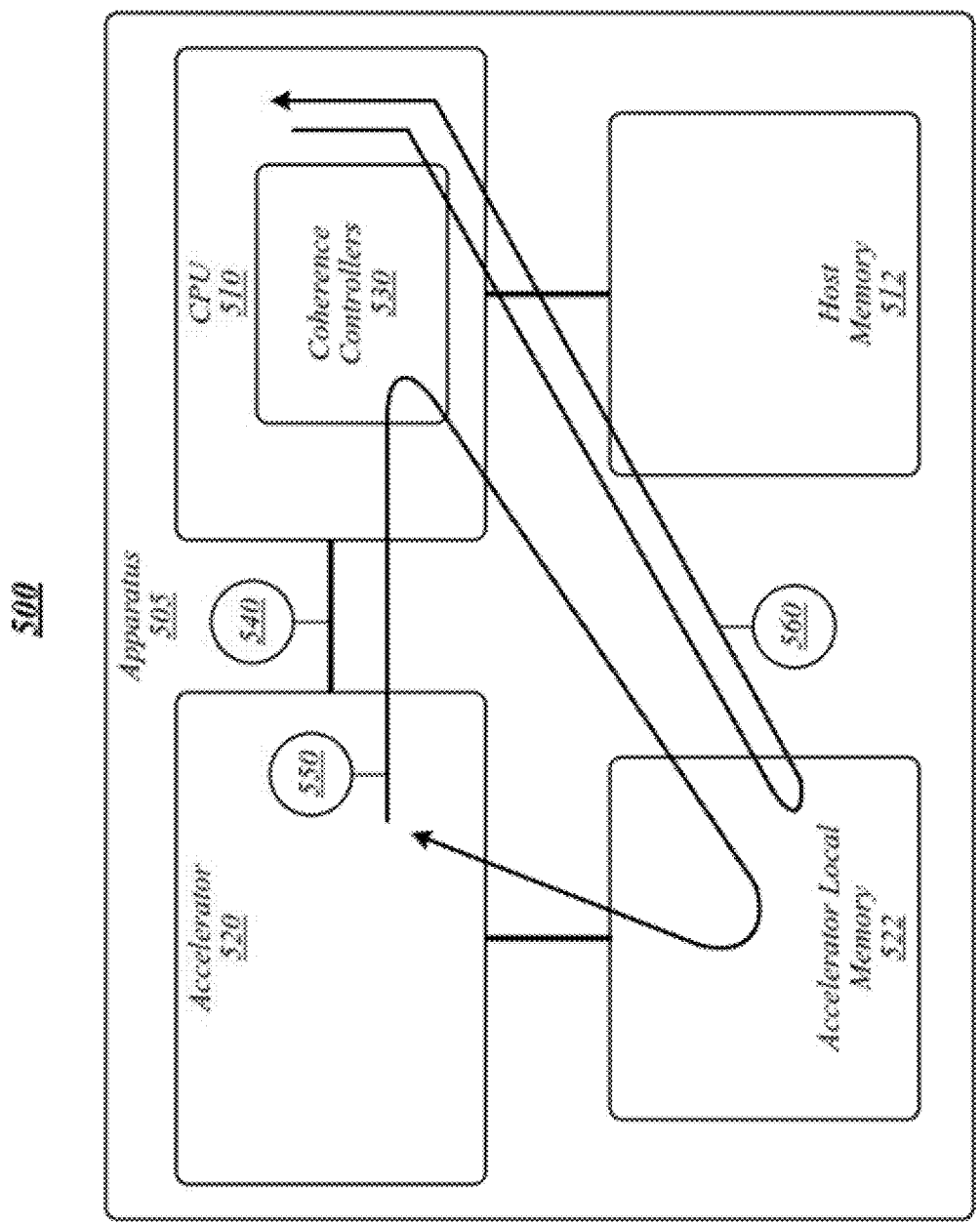
FIGS. 5a and 5b illustrate further example operating environments that may be representative of various embodiments, according to one or more examples of the present specification.

FIG. 5*a* illustrates an example of an operating environment 500 that may be representative of various embodiments. The operating environment 500 depicted in FIG. 5*a* may provide a host bias process flow according to some embodiments. As shown in FIG. 5*a*, an apparatus 505 may include a CPU 510 communicatively coupled to an accelerator 520 via link 540. In some embodiments, link 540 may include a multi-protocol link. CPU 510 may include coherence controllers 530 and may be communicatively coupled to host memory 512. In various embodiments, coherence controllers 530 may be operative to provide one or more standard cache coherence protocols. In some embodiments, coherence controllers 530 may include and/or be associated with various agents, such as a home agent. In some embodiment, CPU 510 may include and/or may be communicatively coupled to one or more IO devices. Accelerator 520 may be communicatively coupled to accelerator memory 522.

Host bias process flows 550 and 560 may include a set of data flows that funnel all request to accelerator memory 522 through coherence controllers 530 in CPU 510, including requests from accelerator 520. In this manner, accelerator 522 takes a circuitous route to access accelerator memory 522, but allows accesses from both accelerator 522 and CPU 510 (including requests from IO devices via CPU 510) to be maintained as coherent using standard cache coherence protocols of coherence controllers 530. In some embodiments, host bias process flows 550 and 560 may use an intra-device protocol (for instance, IDI). In some embodiments, host bias process flows 550 and 560 may use standard opcodes of an intra-device protocol (for instance, IDI), for example, to issue requests over multi-protocol link 540 to coherence controllers 530. In various embodiments, coherence controllers 530 may issue various coherence messages (for example, snoops) that result from requests from accelerator 520 to all peer processor chips and internal processor agents on behalf of accelerator 520. In some embodiments, the various coherence messages may include point-to-point protocol (for instance, UPI) coherence messages and/or intra-device protocol (for instance, IDI) messages.

In some embodiments, coherence controllers 530 may conditionally issue memory access messages to an accelerator memory controller (not shown) of accelerator 520 over multi-protocol link 540. Such memory access messages may be the same or substantially similar to memory access messages that coherence controllers 530 may send to CPU memory controllers (not shown), and may include new opcodes that allows data to be returned directly to an agent internal to accelerator 520, instead of forcing data to be returned to coherence controllers and then returned to accelerator 520 as an intra-device protocol (for instance, IDI) response again over multi-protocol link 540.

Host bias process flow 550 may include a flow resulting from a request or memory operation for accelerator memory 522 originating from accelerator. Host bias process pathway 560 may include a flow resulting from a request or memory operation for accelerator memory 522 originating from CPU 510 (or an IO device or software application associated with CPU 510). When apparatus 505 is active in a host bias mode, host bias process flows 550 and 560 may be used to access accelerator memory 522 as shown in FIG. 5a. In various embodiments, in host bias mode, all request from CPU 510 that target accelerator memory 522 may be sent directly to coherence controllers 530. Coherence controllers 530 may apply standard cache coherence protocols and send standard cache coherence messages. In some embodiments, coherence controllers 530 may send memory interconnect protocol (for instance, SMI3) commands over multi-protocol link 540 for such requests, with the memory interconnect protocol (for instance, SMI3) flows returning data across multi-protocol link 540.

Figure 5B:
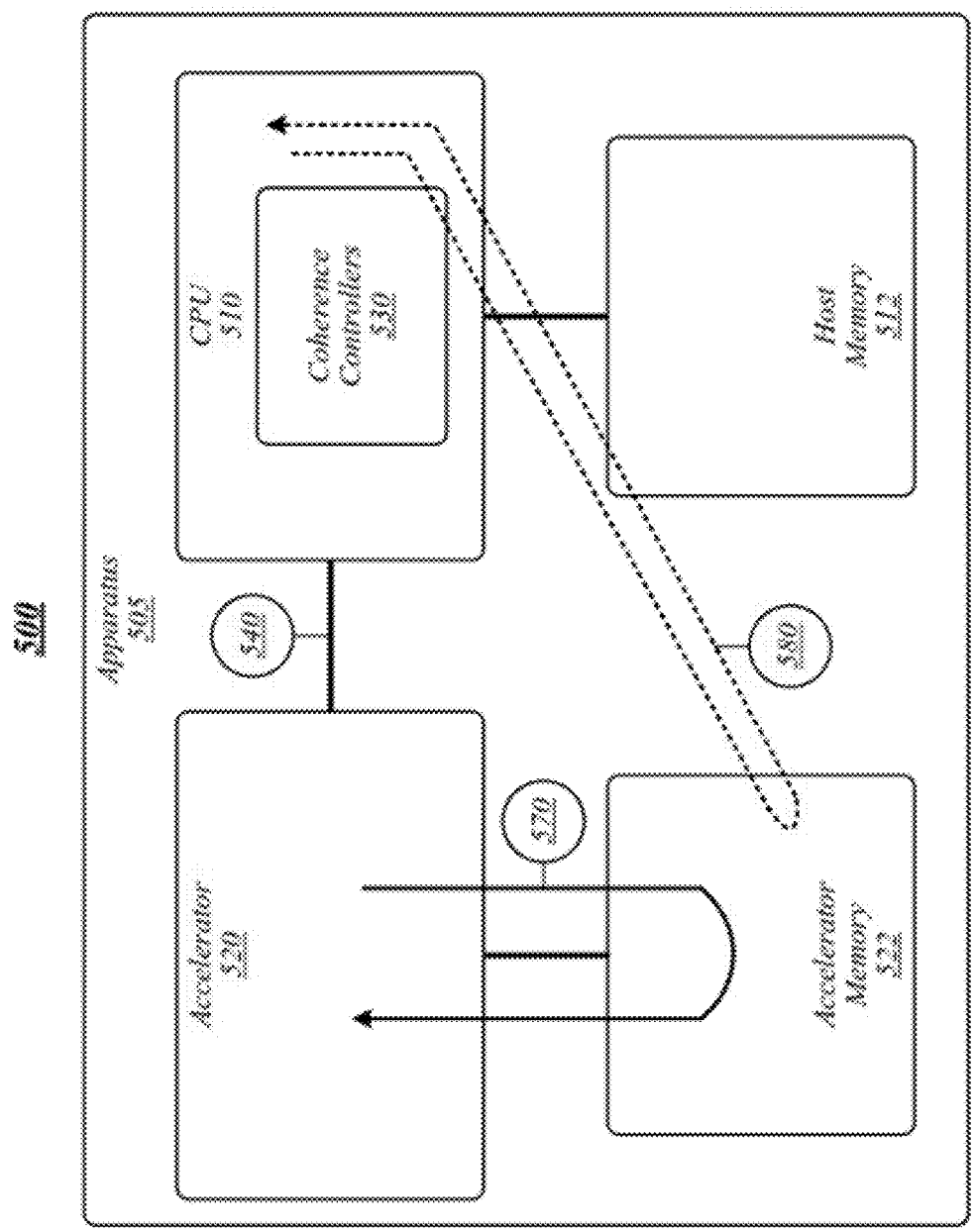

FIG. 5b illustrates a further example of an operating environment 500 that may be representative of various embodiments. The operating environment 500 depicted in FIG. 5a may provide a device bias process flow according to some embodiments. As shown in FIG. 5, when apparatus 505 is active in a device bias mode, a device bias pathway 570 may be used to access accelerator memory 522. For example, device bias flow or pathway 570 may allow accelerator 520 to directly access accelerator memory 522 without consulting coherence controllers 530. More specifically, a device bias pathway 570 may allow accelerator 520 to directly access accelerator memory 522 without having to send a request over multi-protocol link 540.

In device bias mode, CPU 510 requests for accelerator memory may be issued the same or substantially similar as described for host bias mode according to some embodiments, but are different in the memory interconnect protocol (for instance, SMI3) portion of pathway 580. In some embodiments, in device bias mode, CPU 510 requests to attached memory may be completed as though they were issued as "uncached" requests. In general, data of uncached requests during device bias mode is not cached in the CPUs cache hierarchy. In this manner, accelerator 520 is allowed to access data in accelerator memory 522 during device bias mode without consulting coherence controllers 530 of CPU 510. In some embodiments, uncached requests may be implemented on the CPU 510 intra-device protocol (for instance, IDI) bus. In various embodiments, uncached requests may be implemented using a globally observed, use once (GO-UO) protocol on the CPU 510 intra-device protocol (for instance, IDI) bus. For example, a response to an uncached request may return a piece of data to CPU 510 and instruct CPU 510 to only use the piece of data once, for instance, to prevent caching of the piece of data and to support the use of an uncached data flow.

In some embodiments, apparatus 505 and/or CPU 510 may not support GO-UO. In such embodiments, uncached flows (for example, pathway 580) may be implemented using multi-message response sequences on a memory interconnect protocol (for instance, SMI3) of multi-protocol link 540 and CPU 510 intra-device protocol (for instance, IDI) bus. For instance, when CPU 510 is targeting a "device bias" page of accelerator 520, accelerator 520 may set up one or more states to block future request to the target memory region (for instance, a cache line) from accelerator 520 and sends a "device bias hit" response on the memory interconnect protocol (for instance, SMI3) line of multi-protocol link 540. In response to the "device bias hit" message, coherence controller 530 (or agents thereof) may return data to a requesting processor core, followed immediately by a snoop-invalidate message. When the corresponding processor core acknowledges that snoop-invalidate is complete, coherence controller 530 (or agents thereof) may send a "device bias block complete" message to accelerator 520 on the memory interconnect protocol (for instance, SMI3) line of multi-protocol link 540. In response to receiving the "device bias block complete" message, accelerator may clear the corresponding blocking state.

Referring to FIG. 4, bias mode information 427 may include a bias indicator configured to indicate an active bias mode (for instance, device bias mode or host bias mode). The selection of the active bias mode may be determined by the bias information 432. In some embodiments, bias information 432 may include a bias table. In various embodiments, the bias table may include bias information 432 for certain regions of accelerator memory, such as pages, lines, and/or the like. In some embodiments, the bias table may include bits (for example, 1 or 3 bits) per accelerator memory 430 memory page. In some embodiments, the bias table may be implemented using RAM, such as SRAM at accelerator 410 and/or a stolen range of accelerator memory 430, with or without caching inside accelerator 410.

In some embodiments, bias information 432 may include bias table entries in the bias table. In various embodiments, the bias table entry associated with each access to accelerator memory 430 may be accessed prior to the actual access of accelerator memory 430. In some embodiments, local requests from accelerator 410 that find their page in device bias may be forwarded directly to accelerator memory 430. In various embodiments, local requests from accelerator 410 that find their page in host bias may be forwarded to host processor 445, for instance, as an intra-device protocol (for instance, IDI) request on multi-protocol link 489. In some embodiments, host processor 445 requests, for instance, using memory interconnect protocol (for instance, SMI3), that find their page in device bias may complete the request using an uncached flow (for instance, pathway 580 of FIG. 5b). In some embodiments, host processor 445 requests, for instance, using memory interconnect protocol (for instance, SMI3), that find their page in host bias may complete the request as a standard memory read of accelerator memory (for instance, via pathway 560 of FIG. 5a).

The bias mode of a bias indicator of bias mode information 427 of a region of accelerator memory 430 (for instance, a memory page) may be changed via a software-based system, a hardware-assisted system, a hardware-based system, or a combination thereof. In some embodiments, the bias indicator may be changed via an application programming interface (API) call (for instance, OpenCL), which in turn may call the accelerator 410 device driver (for instance, driver 118). The accelerator 410 device driver may send a message (or enqueue a command descriptor) to accelerator 410 directing accelerator 410 to change the bias indicator. In some embodiments, a change in the bias indicator may be accompanied by a cache flushing operation in host processor 445. In various embodiments, a cache flushing operation may be required for a transition from host bias mode to device bias mode, but may not be required for a transition from device bias mode to host bias mode. In various embodiments, software may change a bias mode of one or more memory regions of accelerator memory 430 via a work request transmitted to accelerator 430.

In certain cases, software may not be able to or may not be able to easily determine when to make a bias transition API call and to identify memory regions requiring bias transition. In such cases, accelerator 410 may provide a bias transition hint process in which accelerator 410 determines a need for a bias transition and sends a message to an accelerator driver (for instance, driver 118) indicating the need for the bias transition. In various embodiments, the bias transition hint process may be activated responsive to a bias table lookup that triggers accelerator 410 accesses to host bias mode memory regions or host processor 445 accesses to device bias mode memory regions. In some embodiments, the bias transition hint process may signal the need for a bias transition to the accelerator driver via an interrupt. In various embodiments, the bias table may include a bias state bit to enable bias transition state values. The bias state bit may be used to allow access to memory regions during the process of a bias change (for instance, when caches are partially flushed and incremental cache pollution due to subsequent requests must be suppressed).

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 6:
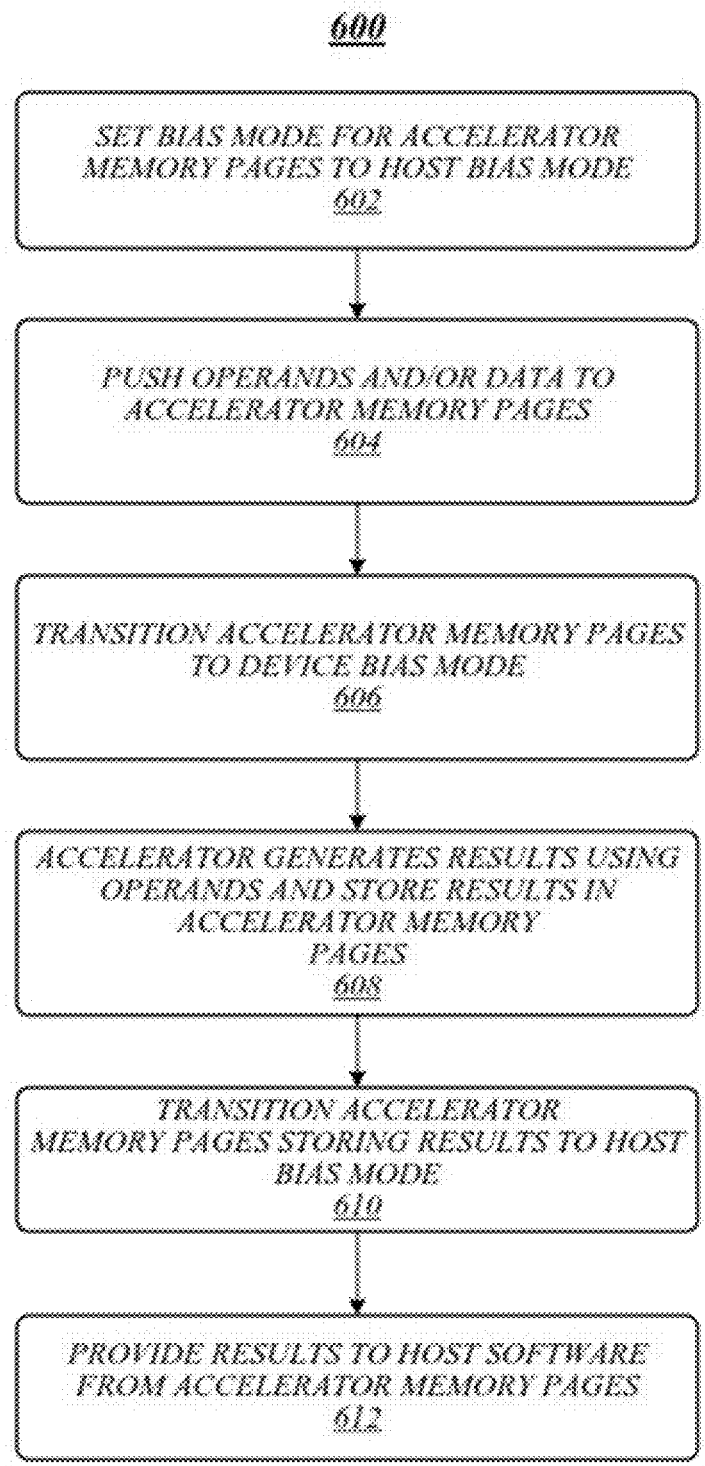
FIG. 6 illustrates an embodiment of a logic flow, according to one or more examples of the present specification.

FIG. 6 illustrates an embodiment of a logic flow 600. The logic flow 600 may be representative of some or all of the operations executed by one or more embodiments described herein, such as apparatus 105, 305, 405, and 505. In some embodiments, logic flow 600 may be representative of some or all of the operations for a coherence bias process according to some embodiments.

As shown in FIG. 6, logic flow 600 may set a bias mode for accelerator memory pages to host bias mode at block 602. For example, a host software application (for instance, software application 140) may set the bias mode of accelerator device memory 430 to host bias mode via a driver and/or API call. The host software application may use an API call (for instance, an OpenCL API) to transition allocated (or target) pages of accelerator memory 430 storing the operands to host bias. Because the allocated pages are transitioning from device bias mode to host bias mode, no cache flushes are initiated. The device bias mode may be specified in a bias table of bias information 432.

At block 604, logic flow 600 may push operands and/or data to accelerator memory pages. For example, accelerator 420 may perform a function for CPU requiring certain operands. The host software application may push operands to allocated pages of accelerator memory 430 from a peer CPU core (for instance, core 465a). Host processor 445 may generate operand data in allocated pages in accelerator memory 430 (and in arbitrary locations in host memory 440).

Logic flow 600 may transition accelerator memory pages to device bias mode at block 606. For example, the host software application may use an API call to transition operand memory pages of accelerator memory 430 to device bias mode. When device bias transition is complete, host software application may submit work to accelerator 430. The accelerator 430 may execute the function associated with the submitted work without host-related coherence overhead.

Logic flow 600 may generate results using operands via accelerator and store the results in accelerator memory pages at block 608. For example, accelerator 420 may perform a function (for instance, a floating-point operation, graphics calculation, FFT operation, and/or the like) using operands to generate results. The results may be stored in accelerator memory 430. In addition, the software application may use an API call to cause a work descriptor submission to flush operand pages from host cache. In some embodiments, cache flush may be executed using a cache (or cache line) flush routine (such as CLFLUSH) on an intra-device protocol (for instance, IDI) protocol. The results generated by the function may be stored in allocated accelerator memory 430 pages.

Logic flow may set the bias mode for accelerator memory pages storing results to host bias mode at block 610. For example, the host software application may use an API call to transition operand memory pages of accelerator memory 430 to host bias mode, without causing coherence processes and/or cache flushing actions. Host CPU 445 may access, cache, and share results. At block 612, logic flow 600 may provide results to host software from accelerator memory pages. For example, the host software application may access the results directly from accelerator memory pages 430. In some embodiments, allocated accelerator memory pages may be released by logic flow. For example, the host software application may use a driver and/or API call to release the allocated memory pages of accelerator memory 430.

Figure 7:
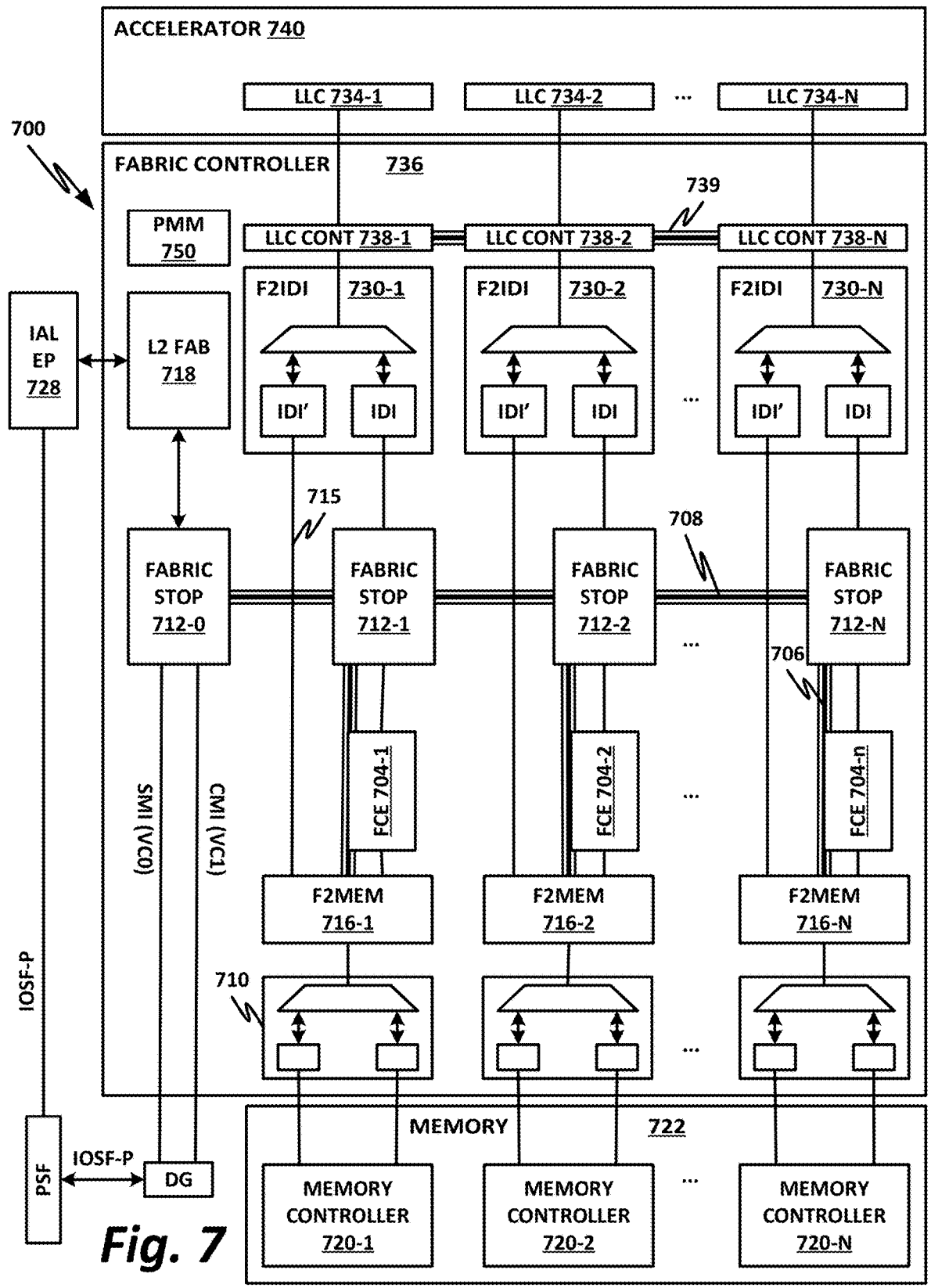
FIG. 7 is a block diagram illustrating a fabric, according to one or more examples of the present specification.

FIG. 7 is a block diagram illustrating a fabric, according to one or more examples of the present specification. In this case, a coherent accelerator fabric 700 is provided. Coherent accelerator fabric 700 interconnects with an IAL endpoint 728, which communicatively couples coherent accelerator fabric 700 to a host device, such as the host devices disclosed in the preceding FIGURES.

Coherent accelerator fabric 700 is provided to communicatively couple accelerator 740 and its attached memory 722 to the host device. Memory 722 includes a plurality of memory controllers 720-1 through 720-n. In one example, 8 memory controllers 720 may service 8 separate memory banks.

Fabric controller 736 includes a set of controllers and interconnects to provide coherent memory fabric 700. In this example, fabric controller 736 is divided into n separate slices to service the n memory banks of memory 722. Each slice may be essentially independent of each other slice. As discussed above, fabric controller 736 includes both "vertical" interconnects 706 and "horizontal" interconnects 708. Vertical interconnects may be generally understood to connect devices upstream or downstream to each other. For example, a last level cache (LLC) 734 connects vertically to LLC controller 738, thereto a fabric, to in-die interconnect (F2IDI) block which communicatively couples fabric controller 736 to accelerator 740. F2IDI 730 provides a downstream link to fabric stop 712, and may also provide a bypass interconnect 715. Bypass interconnect 715 connects an LLC controller 738 directly to a fabric-to-memory interconnect 716, where signals are multiplexed out to a memory controller 720. In the non-bypassed route, requests from F2IDI 730 travel along the horizontal interconnect to the host and then back to fabric stop 712, then to a fabric coherency engine 704, and down to F2MEM 716.

Horizontal buses include buses that interconnect fabric stops 712 to one another and that connect LLC controllers to one another.

In an example, IAL endpoint 728 may receive from the host device a packet including an instruction to perform an accelerated function, along with a payload comprising snoops for the accelerator to operate on. IAL endpoint 728 passes these to L2FAB 718, which acts as a host device interconnect for fabric controller 736. L2FAB 718 may act as the link controller of the fabric, including providing IAL interface controller (although in some embodiments, additional IAL control elements may also be provided, and in general, any combination of elements that provide IAL interface control may be referred to as an "IAL interface controller"). L2FAB 718 controls requests from the accelerator to the host and vice versa. L2FAB 718 may also become an IDI agent and may need to act as ordering agent between the IDI requests from accelerators and snoops from the host.

L2FAB 718 may then operate fabric stop 712-0 to populate the values into memory 722. Fabric stop L2FAB 718 may apply a load-balancing algorithm, such as, for example, a simple address-based hash, to tag payload data for certain destination memory banks. Once memory banks in memory 722 are populated with the appropriate data, accelerator 740 operates fabric controller 736 to fetch values from memory into LLC 734 via an LLC controller 738. Accelerator 740 performs its accelerated computation, then writes outputs to LLC 734, where they are then passed downstream and written out to memory 722.

Fabric stops 712, F2MEM controllers 716, multiplexers 710, and F2IDIs 730 may, in some examples, all be standard buses and interconnects that provide interconnectivity according to well-known principles. The foregoing interconnects may provide virtual and physical channels, interconnects, buses, switching elements, and flow control mechanisms. They may also provide a conflict resolution mechanism related to interactions between accelerator or device agent issued requests and host issued requests. The fabric may include physical buses in the horizontal direction with server ring-like switching as the buses cross the various slices. The fabric may also include a special optimized horizontal interconnect 739 between LLC controllers 738.

Requests from F2IDI 730 may pass through hardware to split and multiplex traffic to the host between the horizontal fabric interconnect and the per-slice optimized paths between LLC controller 738 and memory 722. This includes multiplexing traffic and directing it either to an IDI block where it traverses the traditional route via fabric stop 712 and FCE 704, or using IDI prime to direct traffic to bypass interconnects 715. F2IDI 730-1 may also include hardware to manage ingress and egress, to and from the horizontal fabric interconnect, such as by providing appropriate signaling to fabric stops 712.

IAL interface controller 718 may be a PCIe controller as may be appropriate. The IAL interface controller provides the interface between the packetized IAL bus and the fabric interconnect. It is responsible for queuing and providing flow control for IAL messages, and steering IAL messages to the appropriate fabric physical and virtual channels. L2FAB 718 may also provide arbitration between multiple classes of IAL messages. It may further enforce IAL ordering rules.

At least three control structures within fabric controller 736 provide novel and advantageous features of fabric controller 736 of the present specification. These include LLC controllers 738, FCEs 704, and power management module 750.

Advantageously, LLC controllers 738 may also provide bias control functions according to the IAL bias protocol. Thus, LLC controllers 738 may include hardware for performing cache lookups, hardware for checking the IAL basis for a cache miss request, hardware for steering requests onto the appropriate interconnect path, and logic for responding to snoops issued by the host processor or by an FCE 704.

When steering requests from fabric stop 712 to the host via L2FAB 718, LLC controller 738 determines where traffic should be steered via fabric stop 712, via bypass interconnect 715 directly to F2MEM 716, or via horizontal bus 739 to a different memory controller.

Note that LLC controller 738 in some embodiments is a physically separate device or block from FCE 704. It is possible to provide a single block that provides functions of both LLC controller 738 and FCE 704. However, by separating the two blocks and providing the IAL bias logic in LLC controller 738, it is possible to provide bypass interconnect 715, thus speeding up certain memory operations. Advantageously, in some embodiments, separating LLC controller 738 and FCE 704 may also assist selective power gating in portions of the fabric for more efficient use of resources.

FCE 704 may include hardware for queuing, processing (e.g., issuing snoops to LLC), and tracking SMI requests from the host. This provides coherency with the host device. FCE 704 may also include hardware for queuing requests on the per-slice, optimized path to a memory bank within memory 722. Embodiments of an FCE can also include hardware for arbitrating and multiplexing the aforementioned two request classes onto a CMI memory subsystem interface, and may include hardware or logic for resolving conflicts between the aforementioned two request classes. Further embodiments of an FCE may provide support for ordering of requests from a direct vertical interconnect and requests from FCE 704.

Power management module (PMM) 750 also provides advantages to embodiments of the present specification. For example, consider the case in which each independent slice in fabric controller 736 vertically supports 1 GB per second of bandwidth. 1 GB per second is provided only as an illustrative example, and real-world examples of fabric controller 736 may be either much faster or much slower than 1 GB per second.

LLC 734 may have much higher bandwidth, for example 10 times the bandwidth of the vertical bandwidth of a slice of fabric controller 736. Thus, LLC 734 may have a 10 GB per second bandwidth, which may be bidirectional, so that the total bandwidth through LLC 734 is 20 GB per second. Thus, with 8 slices of fabric controller 736 each supporting 20 GB per second bi-directionally, accelerator 740 may see a total bandwidth of 160 GB per second via horizontal bus 739. Thus, operating LLC controllers 738 and horizontal bus 739 at full speed consumes large amounts of power.

However, as mentioned above, the vertical bandwidth may be 1 GB per slice, and the total IAL bandwidth may be approximately 10 GB per second. Thus, horizontal bus 739 provides a bandwidth that is approximately an order of magnitude higher than the bandwidth of overall fabric controller 736. For example, horizontal bus 739 may include thousands of physical wires, while vertical interconnects may include hundreds of physical wires. Horizontal fabric 708 may support the full bandwidth of the IAL, i.e., 10 GB per second in each direction for a total of 20 GB per second.

Accelerator 740 can perform computations and operate on LLCs 734 at much higher speeds than the host device may be able to consume the data. Thus, data may come into accelerator 740 in bursts, and may then be consumed by the host processor as needed. Once accelerator 740 has completed its computations and populated the appropriate values in LLCs 734, maintaining full bandwidth between LLC controllers 738 consumes a large amount of power that is essentially wasted as LLC controllers 738 no longer need to communicate with one another while accelerator 740 is idle. Thus, while accelerator 740 is idle, LLC controllers 738 may be powered down, thus shutting down horizontal bus 739, while leaving appropriate vertical buses such as from fabric stop 712 to FCE 704 to F2MEM 716 to memory controller 720 live, and also maintaining horizontal bus 708. Because horizontal bus 739 operates at approximately an order of magnitude or more higher than the rest of fabric 700, this can save approximately an order of magnitude of power while accelerator 740 is idle.

Note that some embodiments of coherent accelerator fabric 700 may also provide isochronous controllers, which can be used to provide isochronous traffic to elements that are delay or time-sensitive. For example, if accelerator 740 is a display accelerator, then an isochronous display path may be provided to a display generator (DG), so that a connected display receives isochronous data.

The overall combination of agents and interconnects in coherent accelerator fabric 700 implements IAL functions in a high performance, deadlock free and starvation free manner. It does this while conserving energy, and providing increased efficiency via bypass interconnect 715.

Figure 8:
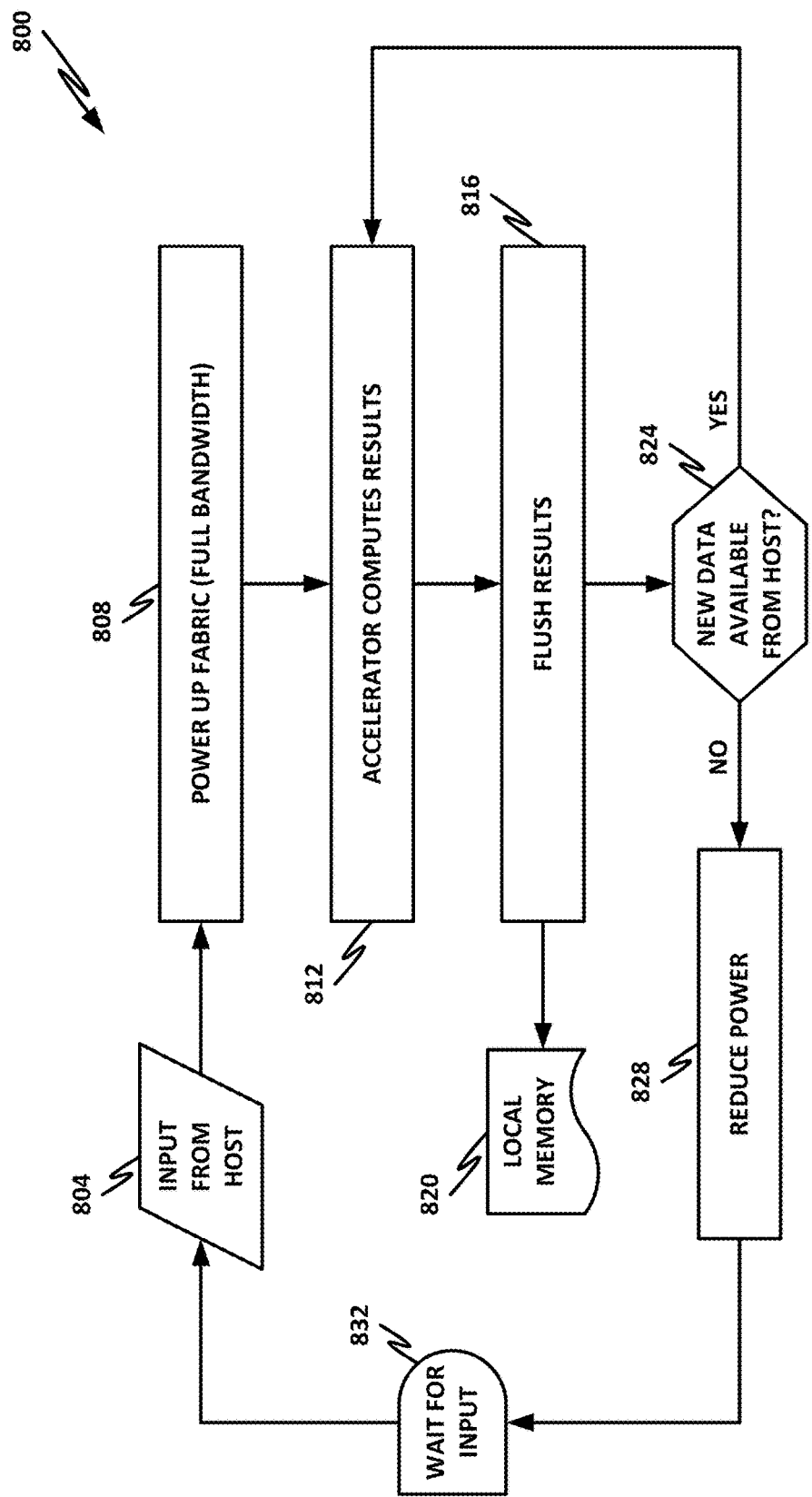
FIG. 8 is a flowchart illustrating a method, according to one or more examples of the present specification.

FIG. 8 is a flowchart of a method 800, according to one or more examples of the present specification. Method 800 illustrates a method of power conservation such as may be provided by PMM 750 of FIG. 7.

Input from host device 804 may reach the coherent accelerator fabric, including an instruction to perform a calculation and a payload for the computation. In block 808, if the horizontal interconnects between LLC controllers are powered down, then the PMM powers the interconnect up to its full bandwidth.

In block 812, the accelerator computes results according to its ordinary function. While computing these results, it may operate the coherent accelerator fabric at its full available bandwidth, including the full bandwidth of the horizontal interconnects between LLC controllers.

When the results are finished, in block 816, the accelerator fabric may flush results to local memory 820.

In decision block 824, the PMM determines whether there are new data available from the host that can be operated on. If any new data are available, then control returns to block 812, and the accelerator continues performing its accelerated function. In the meantime, the host device can consume data directly from local memory 820, which can be mapped in a coherent fashion to the host memory address space.

Returning to block 824, if no new data are available from the host, then in block 828, the PMM reduces power, such as shutting down the LLC controllers, thus disabling the high bandwidth horizontal interconnect between the LLC controllers. As above, because local memory 820 is mapped to the host address memory space, the host can continue to consume data from local memory 820 at the full IAL bandwidth, which in some embodiments is much lower than the full bandwidth between the LLC controllers.

In block 832, the controller waits for new input to come from the host device, and when new data are received, then the interconnect may be powered back up.

FIGS. 9-11 illustrate an example of IAL.mem tunneling over PCIe. The packet formats described include standard PCIe packet fields, with the exception of fields highlighted in gray. Gray fields are those that provide the new tunneling fields.

FIG. 9 is a block diagram of an IAL.mem read over PCIe operation, according to one or more examples of the present specification. New fields include:

MemOpcode (4 bits)—Memory Opcode. Contains information on what memory transaction needs to be processed. For example, reads, writes, no-op etc.

MetaField and MetaValue (2 bits)—Meta Data Field and Meta Data Value. Together, these specify which meta data field in memory needs to be modified and to what value. Meta data field in memory typically contains information associated with the actual data. For example, QPI stores directory states in meta data.

TC (2 bits)—Traffic Class. Used to differentiate traffic belonging to different quality of service classes.

Snp Type (3 bits)—Snoop Type. Used to maintain coherency between the host's and the device's caches.

R (5 bits)—Reserved

FIG. 10 is a block diagram of an IAL.mem write over PCIe operation, according to one or more examples of the present specification. New fields include:

- MemOpcode (4 bits)—Memory Opcode. Contains information on what memory transaction needs to be processed. For example, reads, writes, no-op etc.
- MetaField and MetaValue (2 bits)—Meta Data Field and Meta Data Value. Together, these specify which meta data field in memory needs to be modified and to what value. Meta data field in memory typically contains information associated with the actual data. For example, QPI stores directory states in meta data.
- TC (2 bits)—Traffic Class. Used to differentiate traffic belonging to different quality of service classes.
- Snp Type (3 bits)—Snoop Type. Used to maintain coherency between the host's and the device's caches.
- R (5 bits)—Reserved FIG. 11 is a block diagram of an IAL.mem completion with data over PCIe operation, according to one or more examples of the present specification. New fields include:

- R (1 bit)—Reserved
- Opcode (3 bits)—IAL.io opcode
- MetaField and MetaValue (2 bits)—Meta Data Field and Meta Data Value. Together, these specify which meta data field in memory needs to be modified and to what value. Meta data field in memory typically contains information associated with the actual data. For example, QPI stores directory states in meta data.
- PCLS (4 bits)—Prior Cache Line State. Used for discerning coherency transitions.
- PRE (7 bits)—Performance Encoding. Used by performance monitoring counters in the Host.

Figure 12:
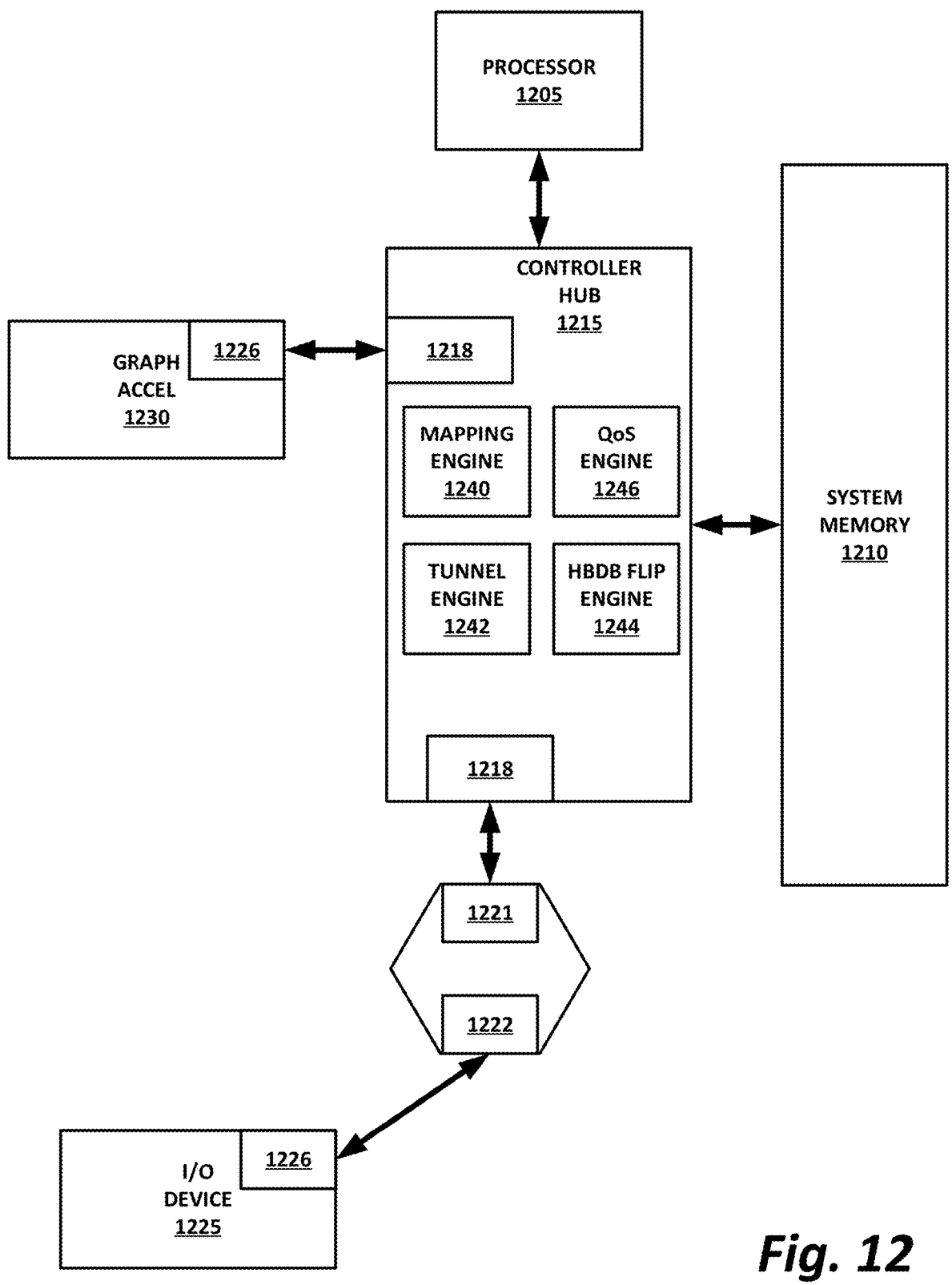
FIG. 12 illustrates an embodiment of a fabric composed of point-to-point links that interconnect a set of components, according to one or more examples of the present specification.

FIG. 12 illustrates an embodiment of a fabric composed of point-to-point links that interconnect a set of components, according to one or more examples of the present specification. System 1200 includes processor 1205 and system memory 1210 coupled to controller hub 1215. Processor 1205 includes any processing element, such as a microprocessor, a host processor, an embedded processor, a coprocessor, or other processor. Processor 1205 is coupled to controller hub 1215 through front-side bus (FSB) 1206. In one embodiment, FSB 1206 is a serial point-to-point interconnect as described below. In another embodiment, link 1206 includes a serial, differential interconnect architecture that is compliant with differential interconnect standards.

System memory 1210 includes any memory device, such as random access memory (RAM), non-volatile (NV) memory, or other memory accessible by devices in system 1200. System memory 1210 is coupled to controller hub 1215 through memory interface 1216. Examples of a memory interface include a double-data rate (DDR) memory interface, a dual-channel DDR memory interface, and a dynamic RAM (DRAM) memory interface.

In one embodiment, controller hub 1215 is a root hub, root complex, or root controller in a Peripheral Component Interconnect Express (PCIe) interconnection hierarchy. Examples of controller hub 1215 include a chipset, a memory controller hub (MCH), a northbridge, an interconnect controller hub (ICH) a southbridge, and a root controller/hub. Often the term chipset refers to two physically separate controller hubs, i.e., a memory controller hub (MCH) coupled to an interconnect controller hub (ICH). Note that current systems often include the MCH integrated with processor 1205, while controller 1215 is to communicate with I/O devices, in a similar manner as described below. In some embodiments, peer-to-peer routing is optionally supported through root complex 1215.

Here, controller hub 1215 is coupled to switch/bridge 1220 through serial link 1219. Input/output modules 1217 and 1221, which may also be referred to as interfaces/ports 1217 and 1221, include/implement a layered protocol stack to provide communication between controller hub 1215 and switch 1220. In one embodiment, multiple devices are capable of being coupled to switch 1220.

Switch/bridge 1220 routes packets/messages from device 1225 upstream, i.e., up a hierarchy towards a root complex, to controller hub 1215 and downstream, i.e., down a hierarchy away from a root controller, from processor 1205 or system memory 1210 to device 1225. Switch 1220, in one embodiment, is referred to as a logical assembly of multiple virtual PCI-to-PCI bridge devices.

Device 1225 includes any internal or external device or component to be coupled to an electronic system, such as an I/O device, a network interface controller (NIC), an add-in card, an audio processor, a network processor, a hard-drive, a storage device, a CD/DVD ROM, a monitor, a printer, a mouse, a keyboard, a router, a portable storage device, a Firewire device, a universal serial bus (USB) device, a scanner, and other input/output devices. Often in the PCIe vernacular, such as device is referred to as an endpoint. Although not specifically shown, device 1225 may include a PCIe to PCI/PCI-X bridge to support legacy or other-version PCI devices. Endpoint devices in PCIe are often classified as legacy, PCIe, or root complex integrated endpoints.

Accelerator 1230 is also coupled to controller hub 1215 through serial link 1232. In one embodiment, graphics accelerator 1230 is coupled to an MCH, which is coupled to an ICH. Switch 1220, and accordingly I/O device 1225, is then coupled to the ICH. I/O modules 1231 and 1218 are also to implement a layered protocol stack to communicate between graphics accelerator 1230 and controller hub 1215. Similar to the MCH discussion above, a graphics controller or the graphics accelerator 1230 itself may be integrated in processor 1205.

In some embodiments, accelerator 1230 may be an accelerator such as accelerator 740 of FIG. 7, which provides coherent memory with processor 1205.

In order to support IAL over PCIe, controller hub 1215 (or another PCIe controller) may include extensions to the PCIe protocol, including by way of nonlimiting example a mapping engine 1240, a tunneling engine 1242, a host-bias-to-device-bias flip engine 1244, and a QoS engine 1246.

Mapping engine 1240 may be configured to provide opcode mapping between PCIe instructions and IAL.io (IOSF) opcodes. IOSF provides a non-coherent ordered semantic protocol, and may provide services such as device discovery, device configuration, error reporting, interrupt provision, interrupt handling, and DMA-style data transfers, by way of non-limiting example. Native PCIe may provide corresponding instructions, so that in some cases, the mapping can be a one-to-one mapping.

Tunneling engine 1242 provides IAL.mem (SMI) tunneling over PCIe. This tunneling enables the host (e.g., processor) to map accelerator memory to the host memory address space, and read to and write from the accelerator memory in a coherent fashion. SMI is a transactional memory interface that may be used by a coherent engine on the host to tunnel IAL transactions over PCIe in a coherent fashion. Examples of modified packet structures for such tunneling are illustrated in FIGS. 9-11. In some cases, special fields for this tunneling may be allocated within one or more DVSEC fields of a PCIe packet.

Host-bias-to-device-bias flip engine 1244 provides the accelerator device with the ability to flush host cache lines (required for host to device bias flip). This may be done using a non-allocating zero-length write (i.e., a write with no byte-enable set) from the accelerator device on the PCIe on a cache line granularity. Non-allocating semantics may be described using transaction and processing hints on the transaction layer packets (TLPs). For example:

TH=1, PH=01

This enables the device to invalidate a given cache line, thus enabling it to access its own memory space without losing coherency. The device may issue a read following a page bias flip to ensure all lines are flushed. The device may also implement a CAM to ensure that while a flip is in progress, no new requests to the line are received from the host.

QoS engine 1246 may divide IAL traffic into two or more virtual channels to optimize the interconnect. For example, these could include a first virtual channel (VC0) for MMIO and configuration operations, a second virtual channel (VC1) for host-to-device writes, and a third virtual channel (VC2) for host-from-device reads.

Figure 13:
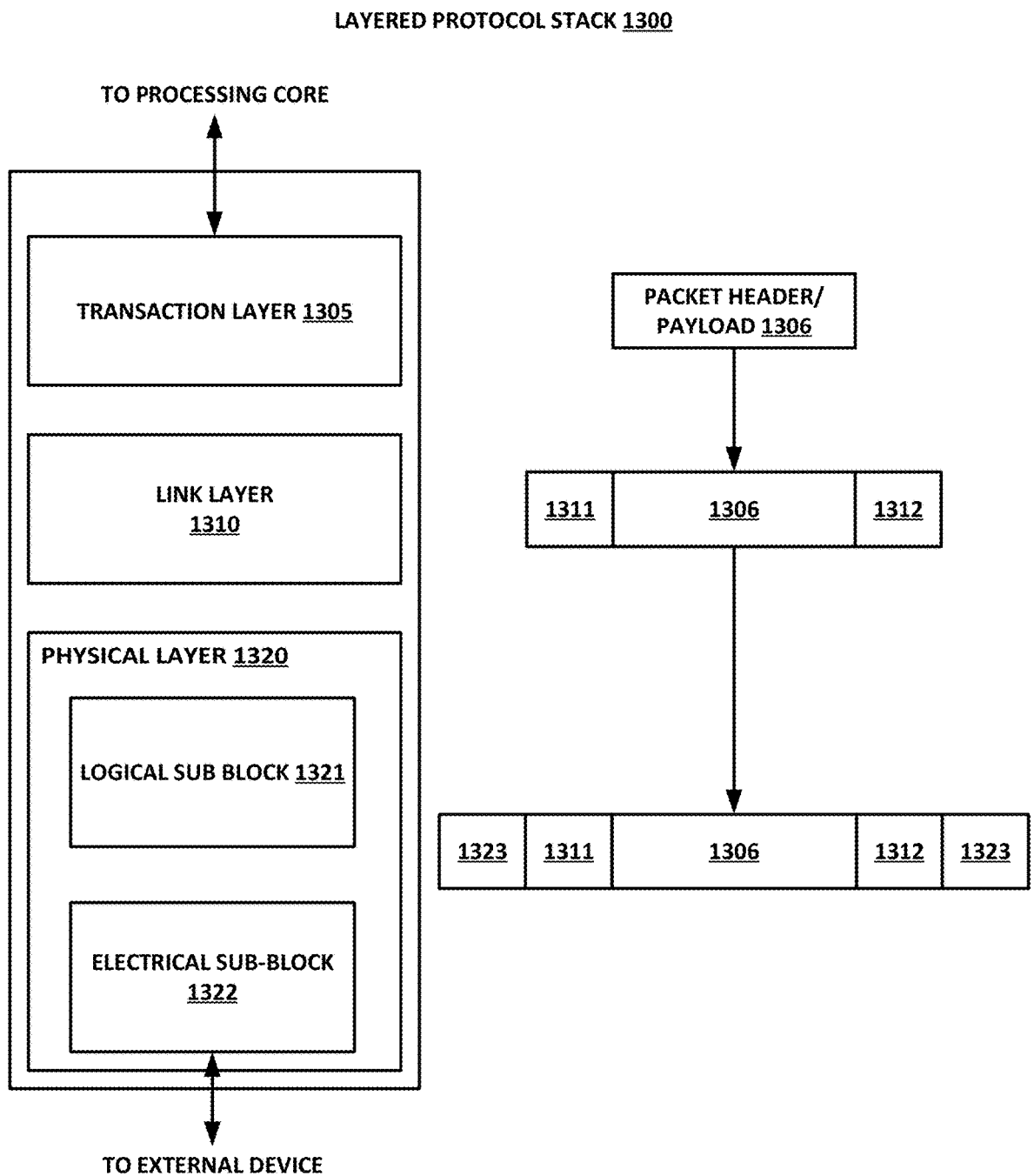
FIG. 13 illustrates an embodiment of a layered protocol stack, according to one or more embodiments of the present specification.

FIG. 13 illustrates an embodiment of a layered protocol stack, according to one or more embodiments of the present specification. Layered protocol stack 1300 includes any form of a layered communication stack, such as a Quick Path Interconnect (QPI) stack, a PCIe stack, a next generation high performance computing interconnect stack, or other layered stack. Although the discussion immediately below in reference to FIGS. 12-15 is presented in relation to a PCIe stack, the same concepts may be applied to other interconnect stacks. In one embodiment, protocol stack 1300 is a PCIe protocol stack including transaction layer 1305, link layer 1310, and physical layer 1320.

An interface, such as interfaces 1217, 1218, 1221, 1222, 1226, and 1231 in FIG. 12, may be represented as communication protocol stack 1300. Representation as a communication protocol stack may also be referred to as a module or interface implementing/including a protocol stack.

PCIe uses packets to communicate information between components. Packets are formed in the transaction layer 1305 and data link layer 1310 to carry the information from the transmitting component to the receiving component. As the transmitted packets flow through the other layers, they are extended with additional information necessary to handle packets at those layers. At the receiving side the reverse process occurs and packets get transformed from their physical layer 1320 representation to the data link layer 1310 representation and finally (for transaction layer packets) to the form that can be processed by the transaction layer 1305 of the receiving device.

Transaction Layer

In one embodiment, transaction layer 1305 is to provide an interface between a device's processing core and the interconnect architecture, such as data link layer 1310 and physical layer 1320. In this regard, a primary responsibility of the transaction layer 1305 is the assembly and disassembly of packets, i.e., transaction layer packets (TLPs). The translation layer 1305 typically manages credit-based flow control for TLPs. PCIe implements split transactions, i.e., transactions with request and response separated by time, allowing a link to carry other traffic while the target device gathers data for the response.

In addition, PCIe utilizes credit-based flow control. In this scheme, a device advertises an initial amount of credit for each of the receive buffers in transaction layer 1305. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more read requests and write requests to transfer data to/from a memory-mapped location. In one embodiment, memory space transactions are capable of using two different address formats, e.g., a short address format, such as a 32-bit address, or a long address format, such as a 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1305 assembles packet header/payload 1306. Format for current packet headers/payloads may be found in the PCIe specification at the PCIe specification website.

FIG. 14 illustrates an embodiment of a PCIe transaction descriptor, according to one or more examples of the present specification. In one embodiment, transaction descriptor 1400 is a mechanism for carrying transaction information. In this regard, transaction descriptor 1400 supports identification of transactions in a system. Other potential uses include tracking modifications of default transaction ordering and association of transaction with channels.

Transaction descriptor 1400 includes global identifier field 1402, attributes field 1404 and channel identifier field 1406. In the illustrated example, global identifier field 1402 is depicted comprising local transaction identifier field 1408 and source identifier field 1410. In one embodiment, global transaction identifier 1402 is unique for all outstanding requests.

According to one implementation, local transaction identifier field 1408 is a field generated by a requesting agent, and it is unique for all outstanding requests that require a completion for that requesting agent. Furthermore, in this example, source identifier 1410 uniquely identifies the requestor agent within a PCIe hierarchy. Accordingly, together with source ID 1410, local transaction identifier 1408 field provides global identification of a transaction within a hierarchy domain.

Attributes field 1404 specifies characteristics and relationships of the transaction. In this regard, attributes field 1404 is potentially used to provide additional information that allows modification of the default handling of transactions. In one embodiment, attributes field 1404 includes priority field 1412, reserved field 1414, ordering field 1416, and no-snoop field 1418. Here, priority subfield 1412 may be modified by an initiator to assign a priority to the transaction. Reserved attribute field 1414 is left reserved for future, or vendor-defined usage. Possible usage models using priority or security attributes may be implemented using the reserved attribute field.

In this example, ordering attribute field 1416 is used to supply optional information conveying the type of ordering that may modify default ordering rules. According to one example implementation, an ordering attribute of "0" denotes default ordering rules to apply, wherein an ordering attribute of "1" denotes relaxed ordering, writes can pass writes in the same direction, and read completions can pass writes in the same direction. Snoop attribute field 1418 is utilized to determine if transactions are snooped. As shown, channel ID field 1406 identifies a channel that a transaction is associated with.

Link Layer

Link layer 1310, also referred to as data link layer 1310, acts as an intermediate stage between transaction layer 1305 and the physical layer 1320. In one embodiment, a responsibility of the data link layer 1310 is providing a reliable mechanism for exchanging TLPs between two linked components. One side of the data link layer 1310 accepts TLPs assembled by the transaction layer 1305, applies packet sequence identifier 1311, i.e., an identification number or packet number, calculates and applies an error detection code, i.e., CRC 1312, and submits the modified TLPs to the physical layer 1320 for transmission across a physical to an external device.

Physical Layer

In one embodiment, physical layer 1320 includes logical sub-block 1321 and electrical sub-block 1322 to physically transmit a packet to an external device. Here, logical sub-block 1321 is responsible for the "digital" functions of physical layer 1321. In this regard, the logical sub-block includes a transmit section to prepare outgoing information for transmission by physical sub-block 1322, and a receiver section to identify and prepare received information before passing it to the link layer 1310.

Physical block 1322 includes a transmitter and a receiver. The transmitter is supplied by logical sub-block 1321 with symbols, which the transmitter serializes and transmits onto an external device. The receiver is supplied with serialized symbols from an external device and transforms the received signals into a bit-stream. The bit-stream is de-serialized and supplied to logical sub-block 1321. In one embodiment, an 8$b$/10$b$ transmission code is employed, where ten-bit symbols are transmitted/received. Here, special symbols are used to frame a packet with frames 1323. In addition, in one example, the receiver also provides a symbol clock recovered from the incoming serial stream.

As stated above, although transaction layer 1305, link layer 1310, and physical layer 1320 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e., a transaction layer; a second layer to sequence packets, i.e., a link layer; and a third layer to transmit the packets, i.e., a physical layer. As a specific example, a common standard interface (CSI) layered protocol is utilized.

FIG. 15 illustrates an embodiment of a PCIe serial point-to-point fabric, according to one or more examples of the present specification. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1506/1511 and a receive pair 1512/1507. Accordingly, device 1505 includes transmission logic 1506 to transmit data to device 1510 and receiving logic 1507 to receive data from device 1510. In other words, two transmitting paths, i.e., paths 1516 and 1517, and two receiving paths, i.e., paths 1518 and 1519, are included in a PCIe link.

A transmission path refers to any path for transmitting data, such as a transmission line, a copper line, an optical line, a wireless communication channel, an infrared communication link, or other communication path. A connection between two devices, such as device 1505 and device 1510, is referred to as a link, such as link 1515. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1516 and 1517, to transmit differential signals. As an example, when line 1516 toggles from a low voltage level to a high voltage level, i.e., a rising edge, line 1517 drives from a high logic level to a low logic level, i.e., a falling edge. Differential signals potentially demonstrate better electrical characteristics, such as better signal integrity, i.e., cross-coupling, voltage overshoot/undershoot, ringing, etc. This allows for a better timing window, which enables faster transmission frequencies.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example a fabric controller to provide a coherent accelerator fabric, comprising: a host interconnect to communicatively couple to a host device; a memory interconnect to communicatively couple to an accelerator memory; an accelerator interconnect to communicatively couple to an accelerator having a last-level cache (LLC); and an LLC controller configured to provide a bias check for memory access operations.

There is further disclosed a fabric controller, further comprising a fabric coherency engine (FCE) configured to enable mapping of the accelerator memory to a host fabric memory address space, wherein the fabric controller is configured to direct host memory access operations to the accelerator memory via the FCE.

There is further disclosed a fabric controller, wherein the FCE is physically separate from the LLC controller.

There is further disclosed a fabric controller, further comprising a direct bypass bus to connect the LLC to the memory interconnect and bypass the FCE.

There is further disclosed a fabric controller, wherein the fabric controller is configured to provide the fabric in a plurality of n independent slices.

There is further disclosed a fabric controller, wherein n=8.

There is further disclosed a fabric controller, wherein the n independent slices comprise n independent LLC controllers interconnected via a horizontal interconnect and communicatively coupled to respective memory controllers via respective vertical interconnects.

There is further disclosed a fabric controller, further comprising a power manager configured to determine that the LLC controllers are idle, and to power down the horizontal interconnect and maintain the respective vertical interconnects and host interconnect in an active state.

There is further disclosed a fabric controller, wherein the LLC is a level 3 cache.

There is further disclosed a fabric controller, wherein the host interconnect is an Intel Accelerator Link (IAL)-compliant interconnect.

There is further disclosed a fabric controller, wherein the host interconnect is a PCIe interconnect.

There is further disclosed a fabric controller, wherein the fabric controller is an integrated circuit.

There is further disclosed a fabric controller, wherein the fabric controller is an intellectual property (IP) block.

There is also disclosed an accelerator apparatus, comprising: an accelerator, comprising a last-level cache (LLC); and a fabric controller to provide a coherent accelerator fabric, comprising: a host interconnect to communicatively couple the accelerator to a host device; a memory interconnect to communicatively couple the accelerator and the host device to an accelerator memory; an accelerator interconnect to communicatively couple the accelerator fabric to the LLC; and an LLC controller configured to provide a bias check for memory access operations.

There is further disclosed an accelerator apparatus, wherein the fabric controller further comprises a fabric coherency engine (FCE) configured to enable mapping of the accelerator memory to a host fabric memory address space, wherein the fabric controller is configured to direct host memory access operations to the accelerator memory via the FCE.

There is further disclosed an accelerator apparatus, wherein the FCE is physically separate from the LLC controller.

There is further disclosed an accelerator apparatus, wherein the fabric controller further comprises a direct bypass bus to connect the LLC to the memory interconnect and bypass the FCE.

There is further disclosed an accelerator apparatus, wherein the fabric controller is configured to provide the fabric in a plurality of n independent slices.

There is further disclosed an accelerator apparatus, wherein n=8.

There is further disclosed an accelerator apparatus, wherein the n independent slices comprise n independent LLC controllers interconnected via a horizontal interconnect and communicatively coupled to respective memory controllers via respective vertical interconnects.

There is further disclosed an accelerator apparatus, further comprising a power manager configured to determine that the LLC controllers are idle, and to power down the horizontal interconnect and maintain the respective vertical interconnects and host interconnect in an active state.

There is further disclosed an accelerator apparatus, wherein the LLC is a level 3 cache.

There is further disclosed an accelerator apparatus, wherein the host interconnect is an Intel Accelerator Link (IAL)-compliant interconnect.

There is further disclosed an accelerator apparatus, wherein the host interconnect is a PCIe interconnect.

There are also disclosed one or more tangible, non-transitory computer-readable mediums having stored thereon instructions to provide a fabric controller, comprising instructions to: provision a host interconnect to communicatively couple to a host device; provision a memory interconnect to communicatively couple to an accelerator memory; provision an accelerator interconnect to communicatively couple to an accelerator having a last-level cache (LLC); and provision an LLC controller configured to provide a bias check for memory access operations.

There are further disclosed one or more tangible, non-transitory computer-readable mediums, wherein the instructions are further to provision a fabric coherency engine (FCE) configured to enable mapping of the accelerator memory to a host fabric memory address space, wherein the fabric controller is configured to direct host memory access operations to the accelerator memory via the FCE.

There are further disclosed one or more tangible, non-transitory computer-readable mediums, wherein the FCE is physically separate from the LLC controller.

There are further disclosed one or more tangible, non-transitory computer-readable mediums, further comprising a direct bypass bus to connect the LLC to the memory interconnect and bypass the FCE.

There are further disclosed one or more tangible, non-transitory computer-readable mediums, wherein the fabric controller is configured to provide the fabric in a plurality of n independent slices.

There are further disclosed one or more tangible, non-transitory computer-readable mediums, wherein n=8.

There are further disclosed one or more tangible, non-transitory computer-readable mediums, wherein the n independent slices comprise n independent LLC controllers interconnected via a horizontal interconnect and communicatively coupled to respective memory controllers via respective vertical interconnects.

There are further disclosed one or more tangible, non-transitory computer-readable mediums, wherein the instructions are further to provision a power manager configured to determine that the LLC controllers are idle, and to power down the horizontal interconnect and maintain the respective vertical interconnects and host interconnect in an active state.

There are further disclosed one or more tangible, non-transitory computer-readable mediums, wherein the LLC is a level 3 cache.

There are further disclosed one or more tangible, non-transitory computer-readable mediums, wherein the host interconnect is an Intel Accelerator Link (IAL)-compliant interconnect.

There are further disclosed one or more tangible, non-transitory computer-readable mediums, wherein the host interconnect is a PCIe interconnect.

There are further disclosed one or more tangible, non-transitory computer-readable mediums, wherein the instructions comprise hardware instructions.

There are further disclosed one or more tangible, non-transitory computer-readable mediums, wherein the instructions comprise field-programmable gate array (FPGA) instructions.

There are further disclosed one or more tangible, non-transitory computer-readable mediums, wherein the instructions comprise data for programming a field-programmable gate array (FPGA).

There are further disclosed one or more tangible, non-transitory computer-readable mediums, wherein the instructions comprise instructions for fabricating a hardware device.

There are further disclosed one or more tangible, non-transitory computer-readable mediums, wherein the instructions comprise instructions for fabricating an intellectual property (IP) block.

There is also disclosed a method of providing a coherent accelerator fabric, comprising: communicatively coupling to a host device; communicatively coupling to an accelerator memory; communicatively coupling to an accelerator having a last-level cache (LLC); and providing within an LLC controller a bias check for memory access operations.

There is further disclosed a method, further comprising providing a fabric coherency engine (FCE) configured to enable mapping of the accelerator memory to a host fabric memory address space, wherein the fabric controller is configured to direct host memory access operations to the accelerator memory via the FCE.

There is further disclosed a method, wherein the FCE is physically separate from the LLC controller.

There is further disclosed a method, further comprising providing a direct bypass path to connect the LLC to the memory interconnect and bypass the FCE.

There is further disclosed a method, further comprising providing the fabric in a plurality of n independent slices.

There is further disclosed a method, wherein n=8.

There is further disclosed a method, wherein the n independent slices comprise n independent LLC controllers interconnected via a horizontal interconnect and communicatively coupled to respective memory controllers via respective vertical interconnects.

There is further disclosed a method, further comprising determining that the LLC controllers are idle, and powering down the horizontal interconnect and maintaining the respective vertical interconnects and host interconnect in an active state.

There is further disclosed a method, wherein the LLC is a level 3 cache.

There is further disclosed a method, wherein the host interconnect is an Intel Accelerator Link (IAL)-compliant interconnect.

There is further disclosed a method, wherein the host interconnect is a PCIe interconnect.

There is also disclosed an apparatus comprising means to perform the method of any of a number of the above examples.

There is also disclosed an apparatus, wherein the means comprise a fabric controller.

There is also disclosed an accelerator device comprising an accelerator, an accelerator memory, and a fabric controller.

There are also disclosed one or more tangible, non-transitory, computer-readable mediums having stored thereon instructions to provide the method or manufacture the device or apparatus of a number of the above examples.

What is claimed is:

1. A fabric controller to provide a coherent accelerator fabric, wherein the fabric controller comprises:
   a host interconnect to communicatively couple to a host device;
   a memory interconnect to communicatively couple to an accelerator memory;
   an accelerator interconnect to communicatively couple to an accelerator having a last-level cache (LLC); and
   an LLC controller configured to provide a bias check for memory access operations,
   wherein at least one of the host interconnect, the memory interconnect, or the accelerator interconnect supports communication of data according to a plurality of different protocols over a common physical channel, and the plurality of different protocols comprise an I/O protocol, a cache protocol, and a memory protocol.

2. The fabric controller of claim 1, further comprising a fabric coherency engine (FCE) configured to enable mapping of the accelerator memory to a host fabric memory address space, wherein the fabric controller is configured to direct host memory access operations to the accelerator memory via the FCE.

3. The fabric controller of claim 2, wherein the FCE is physically separate from the LLC controller.

4. The fabric controller of claim 3, further comprising a direct bypass bus to connect the LLC to the memory interconnect and bypass the FCE.

5. The fabric controller of claim 1, wherein the fabric controller is configured to provide the fabric in a plurality of n independent slices.

6. The fabric controller of claim 5, wherein n=8.

7. The fabric controller of claim 5, wherein the n independent slices comprise n independent LLC controllers interconnected via a horizontal interconnect and communicatively coupled to respective memory controllers via respective vertical interconnects.

8. The fabric controller of claim 7, further comprising a power manager configured to determine that the LLC controllers are idle, and to power down the horizontal interconnect and maintain the respective vertical interconnects and host interconnect in an active state.

9. The fabric controller of claim 1, wherein the LLC is a level 3 cache.

10. The fabric controller of claim 1, wherein the host interconnect is an Intel Accelerator Link (IAL)-compliant interconnect.

11. The fabric controller of claim 1, wherein the host interconnect is a PCIe interconnect.

12. The fabric controller of claim 1, wherein the fabric controller is an integrated circuit.

13. The fabric controller of claim 1, wherein the fabric controller is an intellectual property (IP) block.

14. An accelerator apparatus, comprising:
   an accelerator, comprising a last-level cache (LLC); and
   a fabric controller to provide a coherent accelerator fabric, comprising:
      a host interconnect to communicatively couple the accelerator to a host device;
      a memory interconnect to communicatively couple the accelerator and the host device to an accelerator memory;
      an accelerator interconnect to communicatively couple the accelerator fabric to the LLC; and
      an LLC controller configured to provide a bias check for memory access operations,
   wherein at least one of the host interconnect, the memory interconnect, or the accelerator interconnect is to multiplex data of a plurality of different protocols over common physical channel, and the plurality of protocols comprise an I/O protocol, a cache protocol, and a memory protocol.

15. The accelerator apparatus of claim 14, wherein the fabric controller further comprises a fabric coherency engine (FCE) configured to enable mapping of the accelerator memory to a host fabric memory address space, wherein the fabric controller is configured to direct host memory access operations to the accelerator memory via the FCE.

16. The accelerator apparatus of claim 15, wherein the FCE is physically separate from the LLC controller.

17. The accelerator apparatus of claim 16, wherein the fabric controller further comprises a direct bypass bus to connect the LLC to the memory interconnect and bypass the FCE.

18. The accelerator apparatus of claim 14, wherein the fabric controller is configured to provide the fabric in a plurality of n independent slices.

19. The accelerator apparatus of claim 18, wherein n=8.

20. The accelerator apparatus of claim 18, wherein the n independent slices comprise n independent LLC controllers interconnected via a horizontal interconnect and communicatively coupled to respective memory controllers via respective vertical interconnects.

21. The accelerator apparatus of claim 20, further comprising a power manager configured to determine that the LLC controllers are idle, and to power down the horizontal interconnect and maintain the respective vertical interconnects and host interconnect in an active state.

22. The accelerator apparatus of claim 14, wherein the LLC is a level 3 cache.

23. The accelerator apparatus of claim 14, wherein the host interconnect is an Intel Accelerator Link (IAL)-compliant interconnect.

24. One or more tangible, non-transitory computer-readable mediums having stored thereon instructions to provide a fabric controller, comprising instructions to:
   provision a host interconnect to communicatively couple to a host device;
   provision a memory interconnect to communicatively couple to an accelerator memory;
   provision an accelerator interconnect to communicatively couple to an accelerator having a last-level cache (LLC); and
   provision an LLC controller configured to provide a bias check for memory access operations,
   wherein at least one of the host interconnect, the memory interconnect, or the accelerator interconnect supports communication of data according to a plurality of different protocols over a common physical channel, and the plurality of different protocols comprise an I/O protocol, a cache protocol, and a memory protocol.

25. The one or more tangible, non-transitory computer-readable mediums of claim 24, wherein the instructions are further to provision a fabric coherency engine (FCE) configured to enable mapping of the accelerator memory to a host fabric memory address space, wherein the fabric controller is configured to direct host memory access operations to the accelerator memory via the FCE.

* * * * *